United States Patent [19] [11] 4,008,469

Chapman [45] Feb. 15, 1977

[54] SIGNAL PROCESSING IN SHORT-PULSE GEOPHYSICAL RADAR SYSTEM
[75] Inventor: Jamie C. Chapman, Lexington, Mass.
[73] Assignee: Terrestrial Systems, Incorporated, Lexington, Mass.
[22] Filed: Aug. 6, 1974
[21] Appl. No.: 495,259
[52] U.S. Cl. .............................. 343/5 NA; 324/6; 340/15.5 CP; 340/15.5 GC; 340/7 R;
[51] Int. Cl.² .................... G01S 9/02; G01V/3/12
[58] Field of Search ........ 324/6; 340/7 R, 15.5 GC, 340/15.5 CP; 343/5 NA

[56] References Cited
UNITED STATES PATENTS

| | | | |
|---|---|---|---|
| 1,919,917 | 7/1933 | Truman | 324/6 |
| 2,139,460 | 12/1938 | Potapenko | 343/5 OA |
| 2,165,214 | 7/1939 | Blau et al. | 324/6 X |
| 2,321,341 | 6/1943 | Weatherby et al. | 340/15.5 GC |
| 2,378,925 | 6/1945 | Hoskins | 340/15.5 GC |
| 2,513,279 | 7/1950 | Bradley | 343/5 OA |
| 2,872,996 | 2/1959 | Runge | 340/15.5 CP |
| 3,398,396 | 8/1968 | Embree | 340/15.5 CP |
| 3,412,373 | 11/1968 | Ellis | 340/15.5 CP |
| 3,425,506 | 2/1969 | Evans, Jr. | 340/7 R |
| 3,435,410 | 3/1969 | Babb | 340/7 R |
| 3,437,989 | 4/1969 | Proffitt | 343/15.5 DP |
| 3,447,124 | 5/1969 | Louviere et al. | 324/6 X |
| 3,496,530 | 2/1970 | Brown et al. | 340/15.5 DP |
| 3,568,143 | 3/1971 | Naquin, Jr. | 340/15.5 DP |
| 3,621,380 | 11/1971 | Barlow, Jr. | 324/6 X |
| 3,638,178 | 1/1972 | Stephenson | 340/15.5 DP |
| 3,831,173 | 8/1974 | Lerner | 343/5 OA |

Primary Examiner—Malcolm F. Hubler
Attorney, Agent, or Firm—Littlepage, Quaintance, Murphy & Dobyns

[57] ABSTRACT

Signal processing techniques and apparatus for use in short-pulse geophysical radar systems to improve signal-to-noise ratio, reduce r.f. interference, improve resolution and reduce ambiguities.

6 Claims, 24 Drawing Figures

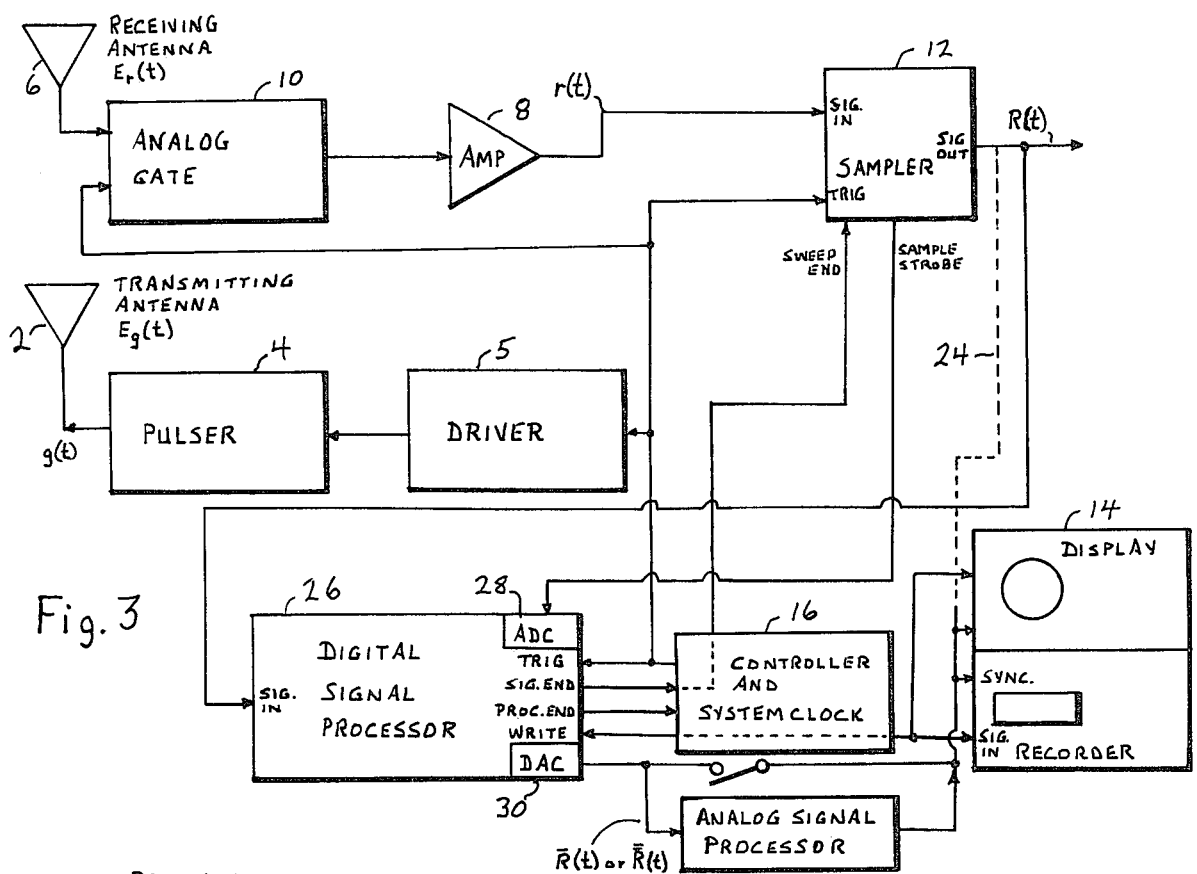
Fig. 3
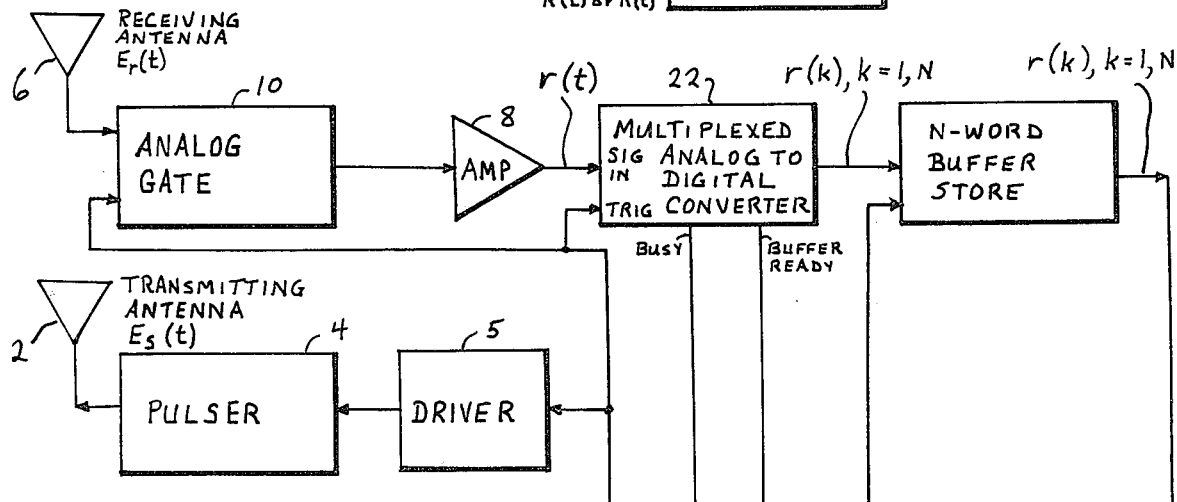
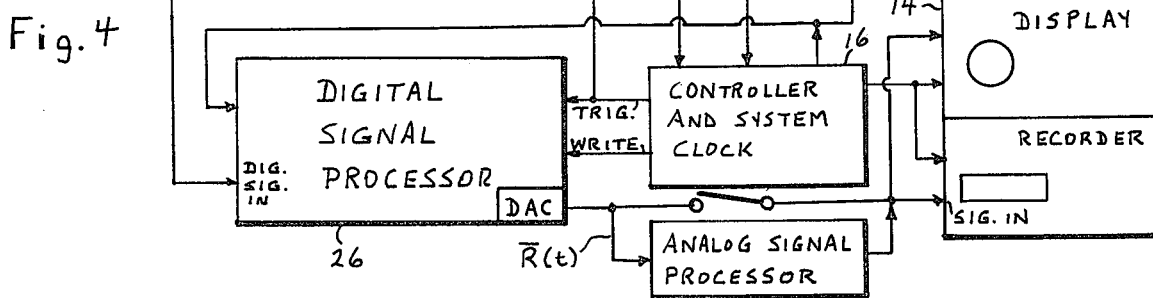
Fig. 4

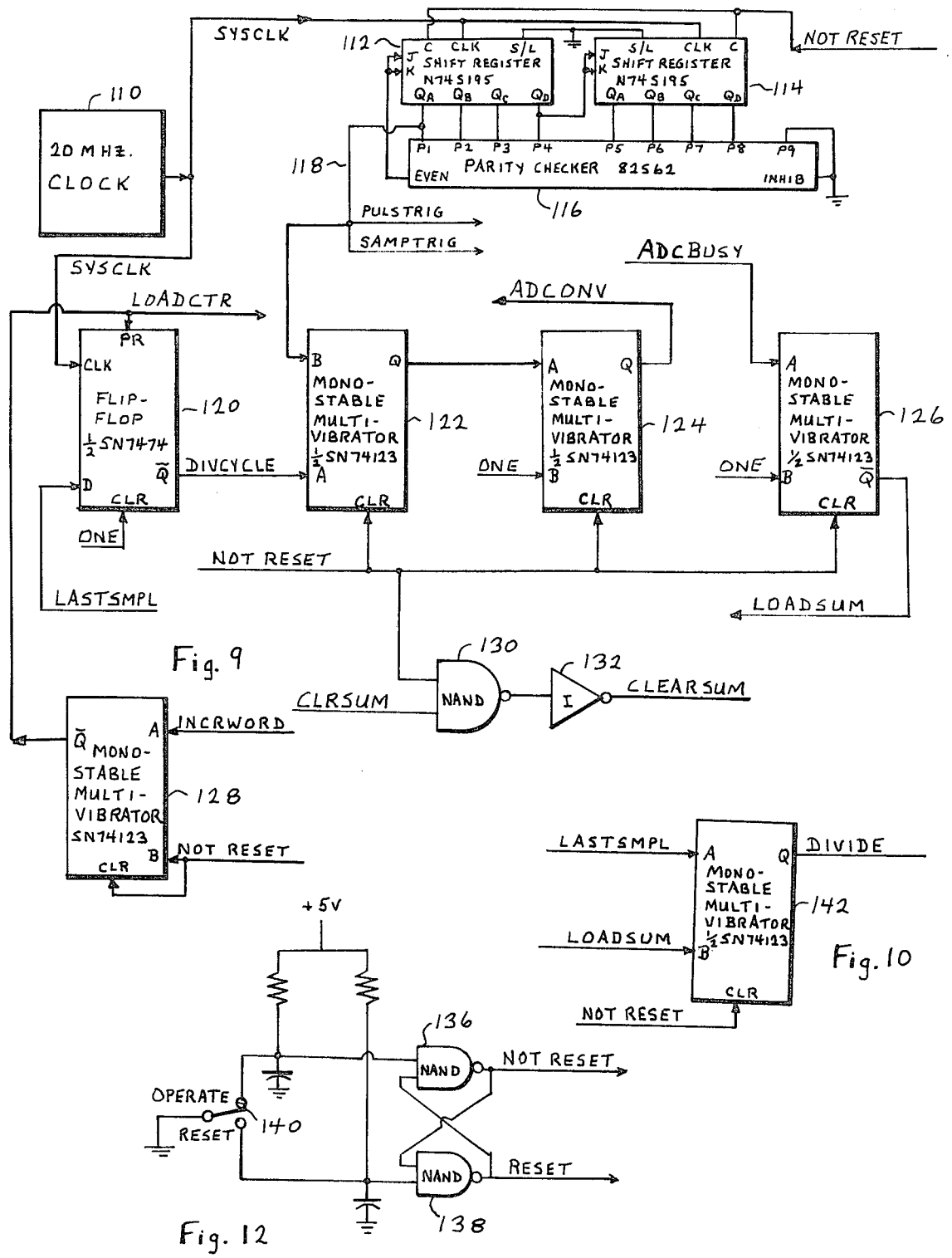

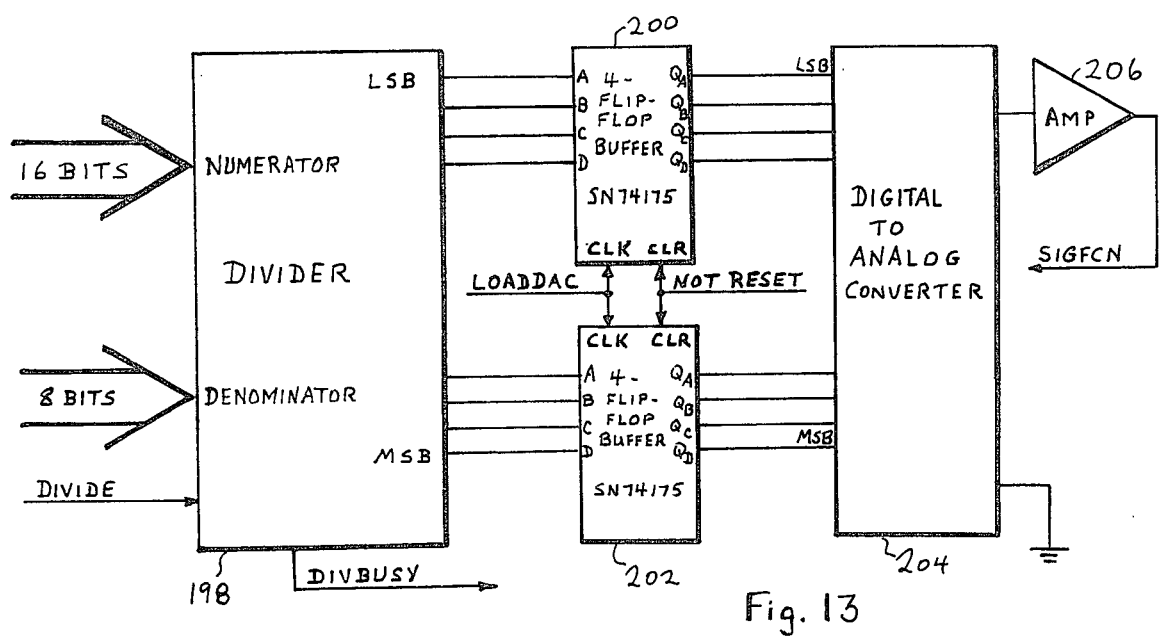
Fig. 13
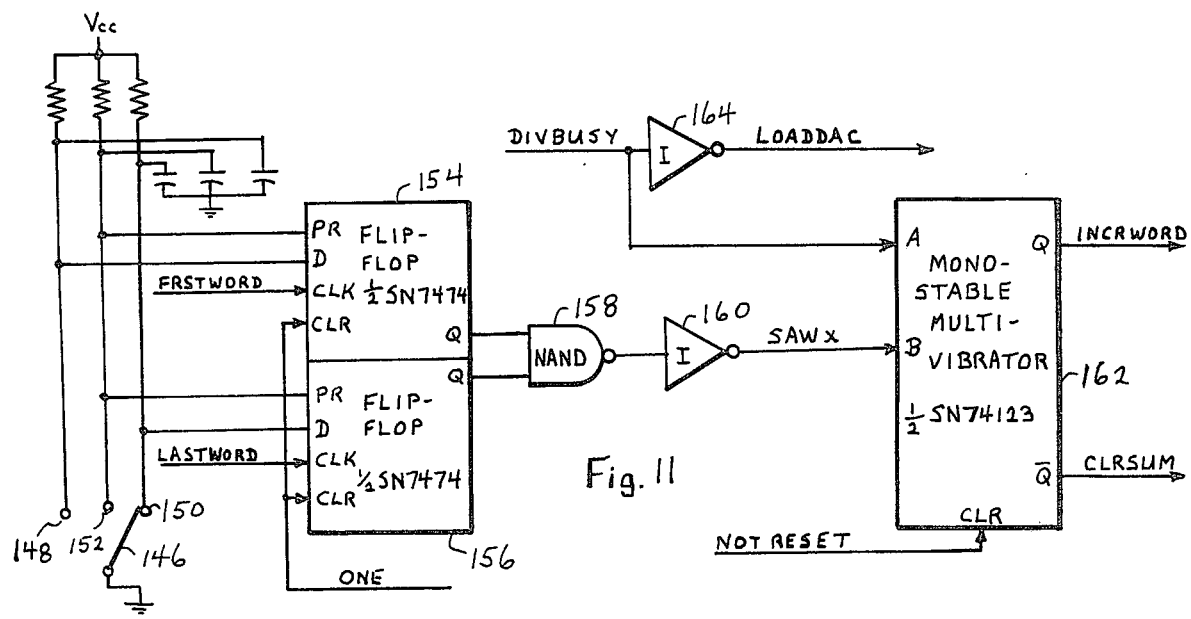
Fig. 11
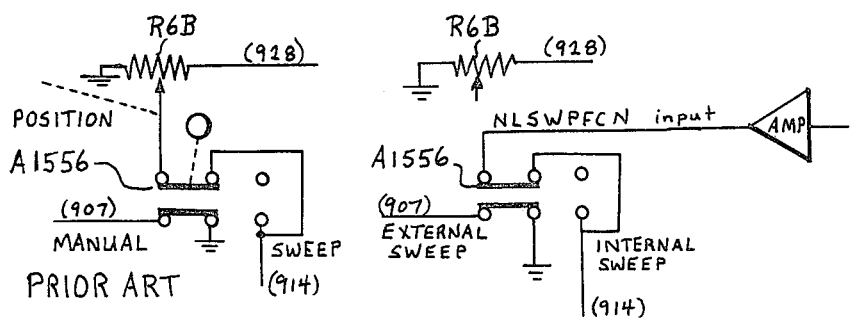
Fig. 17 PRIOR ART
Fig. 18

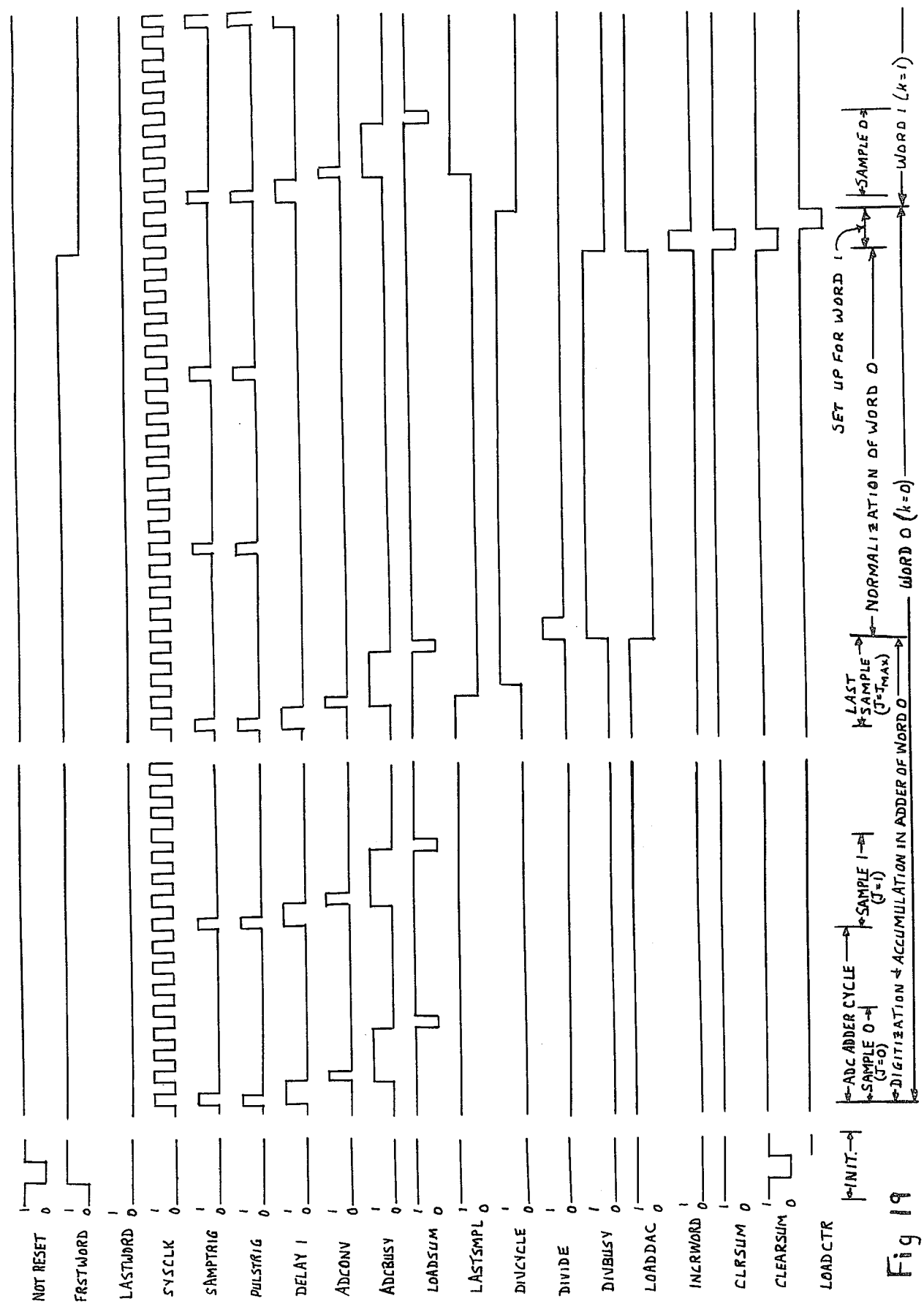

FIG. 2la

SIGNAL GLOSSARY TABLE

| Signal or Waveform Name | Form: Analog or Digital | Short Notation | Full Sequence Notation; Index Range | Purpose or Function | Typical Time Duration | Time to Construct | Constructed From or Source |
|---|---|---|---|---|---|---|---|
| transmitter antenna input pulse(s) | analog | g(t) or g(i,t) | [g(i,t); i=1,∞] | to excite transmitter antenna | Δtg ≈2 nsec | N/A | pulse generator |
| electric field radiated by transmitter antenna | analog | Eg(t) or Eg(i,t) | [Eg(i,t); i=1,∞] | to irradiate target(s) | of same order as g(t) | N/A | g(t) applied to Tx antenna |
| electric field at receiver antenna | analog | Er(t) or Er(i,t) | [Er(i,t); i=1,∞] | contains target information | 200 nsec, more or less | round trip transit time to most distant target | reflections /propagation to and from target |
| voltage, current or charge output of receiving antenna (and associated electronics) | analog | r(t) or r(i,t) | [r(i,t); i=1,∞] | contains target info; fed to sampler or fast ADC | 200 nsec, more or less | round trip transit time to most distant target | analog output of RX antenna |
| transmitter pulse index | N/A | i | i = 1,2,...,∞ | label repetitive Tx pulses and assoc. waveforms | N/A | N/A | N/A |
| Time | N/A | t | N/A | measured from the onset of a waveform | N/A | N/A | N/A |
| transmitter pulse repetition rate (periodic) or avg. separation time (if aperiodic) | N/A | Tpr | N/A | time spacing between pulses | Tpr = 10 μsec | N/A | N/A |

FIG. 2Ib

SIGNAL GLOSSARY TABLE

| Signal or Waveform Name | Form: Analog or Digital | Short Notation | Full Sequence Notation; Index Range | Purpose or Function | Typical Time Duration | Time to Construct | Constructed From or Source |
|---|---|---|---|---|---|---|---|
| sample interval, or effective sample interval | N/A | Tsi | N/A | time between successive samples of $r(t)$ or equiv. | $T_{si} \approx 1$ nsec | N/A | N/A |
| sample strobe or aperture duration | N/A | $\Delta t$strobe | N/A | time taken to sample $r(t)$ | $\Delta t$strobe $\approx 100$ psec | N/A | N/A |
| number of samples along the time-axis of $r(t)$ or equiv; no. of samples at a given time point | N/A | N | N/A | keep track of no. of samples | $N \approx 200$ $N = 10^4$ | N/A | N/A |
| time, depth, or sample no. index | N/A | k | $k=1,N$ | index representing time: $t=(k-1)T_{si}$ or depth or sample no. | N/A | N/A | N/A |
| digital version of $r(t)$ produced in real time from | digital | $r(k)$ or $r(i,k)$ | $[r(i,k); i=1,\infty; k=1,N]$ | contains target information, used in signal processing | 200 nsec more or less | less than Tpr | analog output of RX chain |
| the j-th sampler output waveform | analog | $R(t)$ or $R(j,t)$ | $[R(j,t); j=1,\infty]$ | slowed-down version of $r(t)$ stretched in time by the factor Tpr/Tsi | $10^4 \times 200$ ns $= 2$ µsec | NTpr 2 µsec | N successive versions of $r(t)$: $r(i,t), i=1,N$ |
| digital version of the j-th sampler output waveform | digital | $R(k)$ or $R(j,k)$ | $[R(j,k); j=1,\infty; k=1,N]$ | digital representation of $r(t)$; stored for processing | N/A | NTpr=2µsec (synchronous with construction of $R(t)$) | j-th sampler output waveform |

(where signal is synchronized with sampler)

FIG. 2Ic

SIGNAL GLOSSARY TABLE

| Signal or Waveform Name | Form: Analog or Digital | Short Notation | Full Sequence Notation; Index Range | Purpose or Function | Typical Time Duration | Time to Construct | Constructed From or Source |
|---|---|---|---|---|---|---|---|
| The m-th processed version of $R(k)$ | digital | $\bar{R}(k)$ or $\bar{R}(L,K)$ or $\bar{R}(m,L,K)$ | $[\bar{R}(m,l,k)];$ $m=1,\infty; k=1,N]$ | averaged or otherwise processed form of $r(t)$; displayed or further processed | N/A | $LNTpr=$ $10^4 \times 200$ $\times 10$ usec $= 20$ sec | Linear combination of L successive versions of $R(j,k)$, $j=1,L$ |
| The m-th processed version of $R(k)$ | analog | $\bar{R}(t)$ or $\bar{R}(L,t)$ or $\bar{R}(m,L,t)$ | $[\bar{R}(m,L,t)];$ $m=1,\infty]$ | display for human observer; m-th line on recorder chart | writing time for one line on display /record device | $LNTpr$ followed by DAC settling time $(<10\mu sec)$ | output of DAC when supplied with contents of $\bar{R}(m,L,K)$ file $(k=1,N)$. |
| Index labelling the waveforms $\bar{R}$ and $\bar{\bar{R}}$ | N/A | m | $m=1,\infty$ | label successive versions of the processed waveforms $\bar{R}$ and $\bar{\bar{R}}$ | N/A | N/A | N/A |
| No. of sampler output waveforms | N/A | L | L finite, positive integer | No. of waveforms $R(j,k)$, $k=1,N$ used to form $\bar{R}(k)$, $k=1,N$ | N/A | N/A | N/A |
| The m-th processed version of $R(k)$ (reverse order construction) | digital or analog | $\bar{\bar{R}}(k)$, $\bar{\bar{R}}(m,k) \equiv$ or $R(t)$, $\bar{\bar{R}}(m,t)$ | $[\bar{\bar{R}}(m,k)];k=1,N;$ $m=1,\infty]$ | averaged or processed form of $r(t)$; displayed or further processed | N/A | $<LNTpr$ | reverse order linear combination of $J(N)=L$ succ. vers. of $R(k)$ |
| Operator for reverse order construction of $\bar{\bar{R}}$ | | $J(k)$ | $J(k),k=1,N$ $J$ finite, positive integer | integer distribution (function of the time or depth index k) telling no. of samples to average as a function of k. | N/A | N/A | physically motivat |

FIG. 22

Comparison of time-to-construct, travel, distance, and signal/noise ratio improvement as a function of the number of waveforms averaged.

| | No of rws R used for $\bar{R}$  $L$ | Improvement in s/n $\sqrt{L}$ | Time-to-construct $\bar{R}$ $LNT_{pr}$ | Lateral travel distance $\Delta X$ | |
|---|---|---|---|---|---|
| | | | | v=5 mph =7.3 fps | v=1 mph =1.5 fps |
| CASE A | $10^4$ | 100 | 20 sec | 150 ft | 30 ft |
| | $10^3$ | 33 | 2 sec | 15 ft | 3.0 ft |
| | $10^2$ | 10 | 0.2 sec | 1.5 ft | 0.3 ft |
| CASE B | $10^4$ | 100 | 10 sec | 73 ft | 15 ft |
| | $10^3$ | 33 | 1 sec | 7.3 ft | 1.5 ft |
| | $10^2$ | 10 | 0.1 sec | 0.7 ft | 0.15 ft |

| Assumptions and conditions: | Case A | Case B |
|---|---|---|
| No of samples per rsw  N | 200 | 100 |
| Intersample time  Tsi | 1 nsec | 2 nsec |
| Corresponding depth resolution | 5 cm | 10 cm |
| Duration of rsw  NTsi | -----200 nsec------ | |
| Corresponding depth | ----- 10 m -------- | |
| Transmitter pulse repetition period  Tpr | ----- 10 μsec------ | |

All sample words treated equally.

SIGNAL PROCESSING IN SHORT-PULSE GEOPHYSICAL RADAR SYSTEM

BACKGROUND OF THE INVENTION

1. Field of the Invention

This invention relates to geophysical surveying by short-pulse radar systems, and particularly to improved signal processing techniques for use in such systems.

2. Description of the Prior Art

In the conventional sense of the term, radar is an active electronic system in which a measurement of the round-trip transit time of an electromagnetic radiation pulse (or a sequence of them) is used to determine the distance to the target from which the electromagnetic pulse was reflected. Through use of information present in the return waveform other than the round-trip propagation time delay, other target information may be obtained, such as its radial velocity or shape and size. The transmitted pulses usually are repetitive, but there may be (in effect) only a single pulse. If repetitive, the pulses are usually spaced periodically in time but need not be, in general.

The principal distinctions between a conventional radar and a short-pulse radar (SPR) are to be found in a comparison of the temporal and spectral characteristics of a single pulse from the transmitted sequence.

The conventional radar pulse typically is a tone burst. A tone burst is a segment, n cycles in duration, of a sinusoidal oscillation, which is, of course, characterized by a single frequency $f_o$. The number n of cycles contained in the tone burst may range from 10 to $10^5$ cycles, or long enough for the pulse to have a clearly defined central frequency $f_o$. The truncation of the sinusoid in time broadens the spectrum from that of a single component $f_o$ (i.e., a delta function spectrum) to one having a continuous band of frequencies $\Delta f$ centered about $f_o$. The time duration of the pulse (or alternatively, the large number of cycles n) are such that $\Delta f$ is much smaller than $f_o$. That is, the spectrum of a single pulse of a conventional radar occupies a relatively narrow bandwidth $\Delta f$ which may be characterized by a central frequency $f_o$.

The radiated pulse of a short-pulse radar is a wavelet characterized by only a few excursions or zero crossings (generally less than or approximately equal to 10), and by a time duration which, generally, is shorter than that of a conventional radar pulse. These temporal characteristics manifest themselves in an extremely broadband frequency spectrum which is not characterizable by a single dominant frequency or narrow range of frequencies. The wavelet can be sufficiently short in time to approximate a delta function, which is a mathematical construct having (loosely speaking) zero time duration, an amplitude approaching infinity, and a finite area. The continuous spectrum of a temporal delta function is the most broadband spectrum of all, in that is has a constant amplitude for all frequencies. For this reason, a short-pulse radar is sometimes called a delta-function radar.

Through employment of a combination of antenna and transmission line techniques, the temporal shape of the SPR pulse may be that of a bipolar wavelet having several zero crossings, a bipolar wavelet having only a single zero crossing, or a unipolar field followed (after a controllable time delay) by a single unipolar field pulse of opposite sign (so as to have zero net area, and therefore no DC component in the spectrum of the total radiated pulse.

A short-pulse geophysical radar (SPGR) is a short-pulse radar applied to a geophysical problem. It is an electromagnetic short-pulse radar technique for remotely sensing, from the surface of the earth or above or from within mines and tunnels, the presence and location of subsurface geological features and buried artifacts.

Examples of such subsurface geological features include the interfaces between geological strata, the material of the strata, the presence of boulders, rock, or aggregate, the depth through overburden to bedrock, the presence and extent of cavities or voids in limestone or other materials, and the depth to the water table. Examples of such buried artifacts include metallic or non-metallic utility pipes, conduits, and lines such as might be used for water, gas, and sewage distribution, and other buried metallic and non-metallic objects.

The SPGR technique is applicable also to remotely sensing the presence and location of geological features and artifacts covered in whole or in part by fresh water or ice. Application of the technique to remotely sensing the presence and location of geological features and artifacts covered in whole or in part by salt or certain types of brackish water requires a modification of the prior art systems.

An SPGR system may be conveyed by any appropriate surface means (such as a cart, wagon, sled, hovercraft, automotive vehicle, or water craft) or by an airborne platform (such as a helicopter or other suitable aircraft). The method of conveyance is primarily a matter of convenience since the remote-sensing method described herein is only secondarily dependent in its operation upon the type of conveyance. The only dependence is upon the speed of the conveyance.

FIG. 1 is a general block diagram of prior art SPGR systems. A transmitting antenna 2 is used to radiate short wavelets of electromagnetic energy. A triggered pulser 4 excites the transmitting antenna, and is driven by a driver 5. A receiving antenna 6 senses the electromagnetic energy returned from subsurface interfaces and targets and converts the energy into a voltage, current, or charge return waveform. A wideband amplifier follows the receiving antenna and amplifies the return signal waveform. A time-variable gain element (analog gate 10 or amplifier) follows the receiving antenna, preceding (and, perhaps included with) with wideband amplifier, and is used to protect the receiver chain from high-level, transmitter-induced, non-information-bearing transients. A sampler 12 or sampling oscilloscope converts the information-bearing, short-duration return waveform into an analog replica which is lengthened or stretched in time such that it can be utilized directly by a slow, small-bandwidth record/display device 14, such as a paper chart, helix recorder or a raster-scan oscilloscope. A system controller 16 triggers various system elements and synchronizes the flow of pulses and signal return information among the system elements. The time-variable gain element 10 (labelled analog gate) may have a gain vs. time characteristic such that the gain increases with time to emphasize the later portions of the return signal waveform. Whereas the configuration of FIG. 1 employs separate transmitting and receiving antennas, FIG. 2 illustrates a similar system in which a single antenna 18 is time-shared for both transmitting and receiving through the use of a hybrid network 20.

Alternate prior-art SPGR-like systems utilize some form of sampling to slow down the return signal waveform resulting from a delta function (i.e., a very short duration) stimulus. The system modifications and improvements of this invention are applicable to such systems as well.

The prior art SPGR systems, such as shown in FIGS. 1 and 2, suffer in common from certain serious limitations.

There is a less-than-adequate signal-to-noise ratio in the SPGR return waveform (which carries the information relative to the subsurface targets) due to physically unavoidable severe attenuation and dispersion of the SPGR pulses within the earth. The undesirble effects of this attenuation and dispersion are further compounded by the wide bandwidth required in the receiving electronics to preserve and utilize the information content of the SPGR return waveform in the time domain (as opposed to a frequency domain analysis or display of the information in the return waveform). Since the signal bandwidth must be large (several hundred MHz, almost as large as presently available technology will permit), the noise bandwidth is also large. It is a fundamental electronics axiom that, for a given amplifying system, one obtains increased bandwidth at the expense of decreased gain and increased noise level. A less-than-adequate signal-to-noise ratio in the information-bearing return waveform places serious limitations upon the depth accessible by the technique, upon the usable or effective resolution at a given depth, and upon the operator's capability to unambiguously identify subsurface features.

There is radio-frequency interference (RFI) which occurs due to operation of the SPGR transmitter at high peak power levels, because of an effort to improve the signal-to-noise ratio of the information-bearing return waveform. Although operation of the SPGR at high peak power levels (kw or greater) would not constitute an inherent limitation, the broad spectral bandwidth of the SPGR pulses, and the presence of other users of the available radiofrequency spectrum, such as the communications services and civil aviation, cause legal limitations of available powers to control RFI. Thus such high-power operation could be in violation of FCC regulations, and also might represent a hazard to human life and safety.

There is less-than-adequate resolution along the traverse lines of the SPGR due to geometric spreading out of the radiated wavefronts as they propagate from the transmitter antenna. This leads to the phenomenon of hyperbolics, which are also often seen in acoustic subsurface profiling records wherein a small subsurface target appears to have a hyperbolic shape with the displayed hyperbola opening downwards. This results in a decrease in the effective horizontal resolution since two or more such targets closely spaced may produce a record which is not readily distinguishable from that of a single target.

There is an interpretational ambiguity of the information in the displayed return waveform (as made visible by the system record/display device) due to the fact that a SPGR reflection from a single subsurface interface (geological or otherwise) will manifest itself in the return waveform (and thus in the display) as closely-spaced, multiple interfaces. For example, in the case of the commonly-used helix recorder whereon a record of interface location versus depth is presented, a single interface will be written not as a single point or line, but as closely-spaced, multiple points or lines. Such ambiguities, while recognizable as such under certain favorable conditions, can effectively reduce the resolution with depth since it is not known whether one or a multiplicity of target interfaces has led to the displayed multiple indication. The origin of this undesirable effect lies in the relation between the waveform applied to the transmitter antenna and the resulting electromagnetic field, the propagation characteristics of the fields through or from the interfaces, and finally, the relation of the returned electromagnetic field to the waveform produced at the receiver antenna terminals. It is the signal-return voltage waveform which is displayed in linear or in rectified and compressed fashion.

There is a complete lack of ability of the prior art SPGR systems to operate in salt water so as to obtain information concerning the presence and depth of sub-bottom geological interfaces and artifacts. This lack of ability to operate through salt water is due to the high conductivity of salt water leading to attenuation so severe as to render the technique useless.

SUMMARY OF THE INVENTION

The present invention overcomes these limitations of the present SPGR systems, to provide the following benefits. There is an improvement by orders of magnitude of the signal-to-noise ratio of the SPGR return waveform. This can be accomplished within the instrument at the field measurment site in real-time with no significant delay or slow-down of the speed of a measurement traverse. There is an elimination or reduction of radio-frequency interference by virtue of operation of the SPGR transmitter at exceedingly low power levels. The capability of useful operation at low power levels is a benefit which follows directly from applications of the techniques for signal-to-noise improvement. There is improved spatial resolution along the traverse lines of the SPGR, made possible by further extension of the methods and techniques employed for signal-to-noise ratio improvement. There is an elimination or reduction of interpretational ambiguities arising from the physical electromagnetic transmission, propagation, and reception processes. The time characteristics of the transmitter antenna pulse input waveforms as changed by the process of radiation, propagation, and reception are compensated for by incorporation into the SPGR system of a filter (digital or analog, linear or non-linear) which is designed to deconvolve or otherwise modify the received waveform so as to preserve the subsurface interface time (and thus depth) information while removing the spurious (to the interpretation process) multiple indications.

A relatively simple configuration of the SPGR system will allow one to operate from a platform or vehicle in, on, or over salt water and obtain sub-bottom geological and artifact information.

Of the five limitations of the prior art discussed above, four can be overcome through the incorporation into the SPGR system of one or more forms of signal processing. Techniques for overcoming the fifth limitation, having to do with operation in salt water, involve a system reconfiguration, which is discussed below.

The specification defines signal processing in the present context and presents two versions of SPGR systems incorporating signal processing. In order to allow appreciation of the operation of these systems and an understanding of how the limitations are overcome, the characteristics of the fields and waveforms in SPGR systems are defined and discussed. Based upon the nomenclature thus established, several examples of signal processing are given. The benefits available with a digitized return signal waveform and a digital processor are also discussed.

BRIEF DESCRIPTION OF THE DRAWINGS

FIG. 3 is a schematic block diagram of an indirect or sampling SPGR system with signal processing according to one embodiment of the present invention.

FIG. 4 is a schematic block diagram of a direct digital SPGR system with signal processing according to another embodiment of the present invention.

FIGS. 9, 10 and 11 are more detailed diagrams of the clocking, timing and controlling systems used with the system of FIG. 8.

FIG. 12 is a diagram of a manual starting system for the system of FIG. 8.

FIGS. 13 and 14 are diagrams of other parts of the necessary signal processing for use with the system of FIG. 8.

FIGS. 17 and 18 represent respectively before and after schematic diagrams indicating a slight modification which must be made to a commercial sampling oscilloscope to allow it to work in the present invention.

FIG. 19 is a timing chart for use with the detailed system.

Figures 21a, 21b and 21c illustrate tables defining signals used in the system.

FIG. 22 illustrates a table showing various parameters of the signals being processed as a function of the number of waveforms averaged.

DESCRIPTION OF THE PREFERRED EMBODIMENTS

Figure 1:
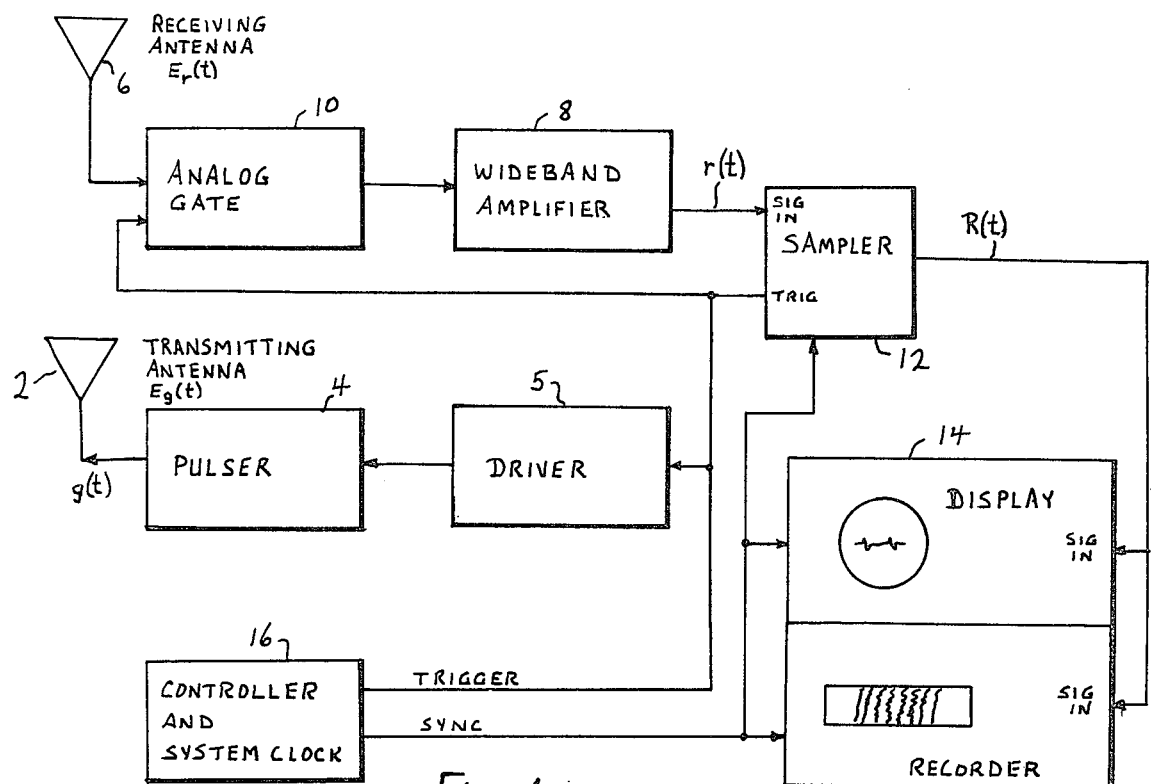
FIG. 1 is a schematic block diagram of a prior art SPGR system.

None of the known prior SPGR systems incorporated signal processing. Signal processing is the use of analog or digital electronic hardware (including software-controlled hardware, as in a minicomputer) to perform mathematical operations upon one or more return signal waveforms, upon combination of return signal waveforms, or upon portions of such waveforms. It is desirable that these operations be performed in real-time, in the field where the SPGR system is being utilized, and in the SPGR system itself.

The objective of signal processing is to make the information contained in the return signal waveform more intelligible to the human observer and user of such information. In so doing, the limitations listed above will be overcome in whole or in part.

Two possible schemes for incorporating signal processing into SPGR system are shown in FIGS. 3 and 4. These systems are to be compared with the generic, non-signal-processing SPGR systems of FIGS. 1 and 2.

The configuration of FIG. 3 or one similar to it is preferred to that of FIG. 4 since it is realizable using relatively economical technology as presently-available technology is priced. Because of the large bandwidth and the required time resolution of the basic return signal waveform, the system of FIG. 4 is at present realizable only at relatively great expense. This situation will probably change, however, with advances in the state-of-the-art in high-speed digital technology. If this advanced technology were available now at a cost which were comparable with the cost to implement the system of FIG. 3, then the system of FIG. 4 would be preferred because of its potentially superior performance.

The return signal waveform, which we denote in its various versions by the symbols $r(t)$, $r(i,t)$, $r(i,k)$, $\overline{r}(k)$, $R(t)$, $R(j,t)$, $R(J,k)$, and $\overline{R}(k)$, is the most important signal or waveform in any SPGR system. The reason is that this waveform is the one which contains the desired subsurface target information and is the one which is eventually displayed for human observation and interpretation. As indicated above, the return signal waveform can have several versions or representation within a SPGR system. A given version may be in analog form, as $r(t)$, $r(i,t)$, $R(t)$, or $R(j,t)$, or in digital form, as $r(i,k)$, $\overline{r}(k)$, $R(j,k)$ or $\overline{R}(k)$. The analog representations may be short in duration with a correspondingly large bandwidth, as $r(t)$, or $r(i,t)$, or may be stretched in time with a decreased bandwidth, as $R(t)$, or $R(j,t)$. It is important that we understand the characteristics of and the relationships among the various forms of the return signal waveform. These characteristics and relationships are connected and summarized in the signal glossary of Tables 1a, 1b, and 1c.

In its most basic and fundamental form, the return signal waveform $r$ is the voltage, current or charge versus time waveform appearing at the output of the receiving antenna or at the output of the wideband amplifier. This waveform is denoted $r(t)$. The time duration of the waveform $r(t)$ is on the order of 200 nseconds. Thus, assume that the time duration of $r(t) =$ 200 nsec. A time duration of 200 nsec for $r(t)$ corresponds to a depth of about 10 meters (for an index of refraction value $n=3$). On the same basis, if a depth resolution of 5 cm is desired, then the corresponding time resolution is about 1.0 nsec. Thus, assume that the time resolution in $r(t) = 1$ nsec. Such a time resolution implies a signal bandwidth of about 500 MHz.

As indicated in the Signal Glossary Table, each return signal waveform $r(t)$ is a result of a transmitter antenna input pulse $g(t)$ and the associated electric fields Eg(t) and Er(t). The transmitter pulses are repetitive and thus form members of a sequence $[g(i,t)$ where $i = 1,2, \ldots \infty]$, where the integer index i is used to label a particular transmitter pulse. The time duration $\Delta tg$ of each transmitter pulse $g(t)$ is is of the order $\Delta tg = 2$ nsec. To indicate that a given waveform $r(t)$ is associated with the $i$th transmitter pulse, it is written $r(i,t)$, where $r(i,t)$ is the return signal waveform associated with the $i$th transmitter pulse. This index (and others) will be needed to keep track of the origins of other, composite versions of the return signal waveform.

The transmitter pulses may be periodic as well as repetitive. To indicate this, the symbol Tpr is used to denote the transmitter pulse repetition period.

Representative values of T$pr$ range from 5 $\mu$sec to 500 $\mu$sec. Assume that T$pr$ =10 $\mu$sec for use in later illustrative calculations.

Figure 2:
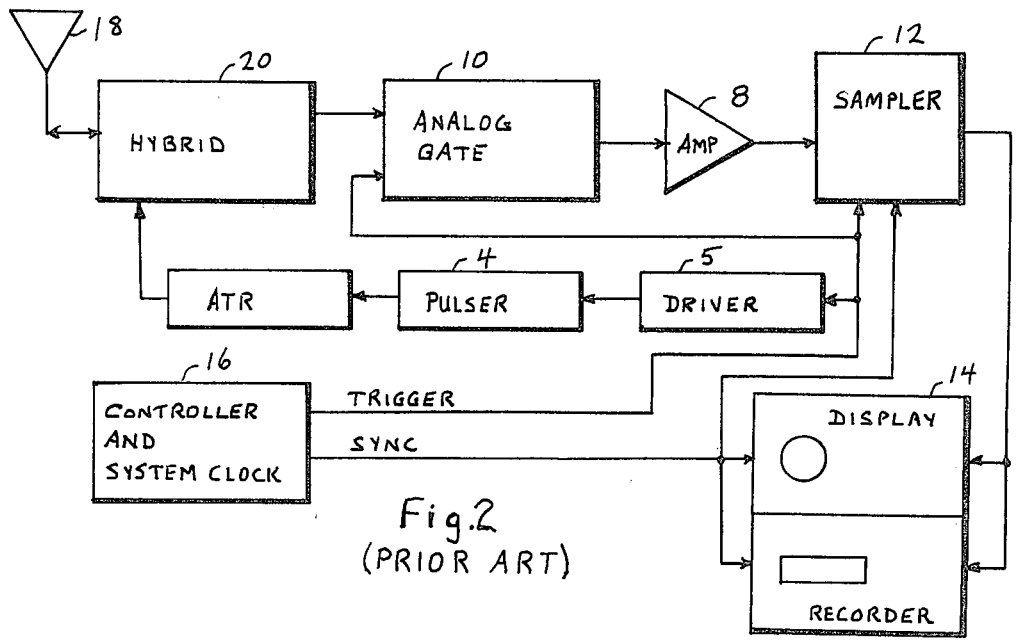
FIG. 2 is a schematic block diagram of an alternate prior art SPGR system.

Although a periodic transmitter pulse sequence is certainly more convenient, it is important to note that it is not necessary to the operation of any of the SPGR systems depicted in FIGS. 1, 3, or 4. It is only necessary that the pulses be repetitive. They may, for example, be randomly separated in time according to a Gaussian distribution characterized by some average interpulse time. In any case, the calculations assume that a given return signal waveform $r(t)$ can be associated uniquely with a single transmitter antenna input pulse $g(t)$, and that the interpulse spacings are such that the waveform $r(t)$ has gone to zero before the application of the succeeding $g(t)$ pulse. That is to say, the duration of $r(t)$ << the interpulse spacing. From the values cited above, it can be seen that this condition is readily satisfied.

In the SPGR system of FIG. 4, each analog return signal waveform $r(t)$ is immediately converted in real-time into its digital equivalent in the analog-to-digital converter (ADC) unit 22. If the transmitter pulses are periodic with a pulse repetition period T$pr$ = 10 microseconds ($\mu$sec), then this period is the time available for the conversion. The direct digital form of $r(t)$ is denoted by $r(k)$ or $r(i,k)$, where $k = 1,2,\ldots,N$ where the integer index $k$ is the sample number of time index and $i$ is the transmitter pulse index previously defined. The integer N represents the number of samples or digital words making up the representation $r(k)$. Typical values of N range from 100 to 1000.

In the context of the direct digital system of FIG. 4, there is a discussion later of the technology for obtaining and the advantages of having a complete version $r(k)$ every T$pr$ seconds.

The basic, primary version of the return signal waveform is $r(t)$. The locations at which $r(t)$ appear are shown in the block diagrams of FIGS. 1, 3, and 4.

The return signal waveform $r(t)$ is treated in fundamentally different ways in the systems of FIGS. 1 and 3 on the one hand, and the system of FIG. 4 on the other hand. The indirect systems of FIGS. 1 and 3 do not and cannot directly utilize $r(t)$ because of its large bandwidth and short duration. These systems employ a sampler 12, often incorporated into a sampling oscilloscope, to produce the second version R of the return signal waveform.

The second version is either a stretched-in-time analog version of $r(t)$ or its digital representation. The former is denoted by $R(t)$ and the latter by $R(k)$. There is also a processed or composite version denoted by $\overline{R}(t)$ or $\overline{R}(k)$, depending upon whether it is in analog or digital form.

Whereas the direct digital system of FIG. 4 utilizes all of the information in each waveform $r(t)$ and provides the N-word version $r(k)$ for each transmitter pulse, the indirect systems using the sampler obtain only a single analog or digital sample for each transmitter pulse. For this reason, such systems require N transmitter pulses to build up the analog or digital representation R of the basic return signal waveform $r(t)$. Thus we say that R is a stretched-in-time version of $r(t)$.

The degree of stretching depends upon the transmitter pulse repetition period T$pr$ and the equivalent time between samples T$si$. The version $R(t)$ will be slowed in time, relative to $r(t)$, by the ratio T$pr$/T$si$. That is, if T$pr$ = 10 $\mu$sec, and T$si$ = 1 nsec, then T$pr$/T$si$ = 1 $\times$ 10$^4$, giving the general and numerical relationships $$R(T) = r\left(\frac{Tpr}{Tsi} t\right) = r(10^4 t).$$

Thus, the point in time $t$=100 nsec in $r(t)$ is represented by the point in time Y=1 msec in the slowed-down, equivalent waveform R(Y).

If the duration of $r(t)$ is 200 nsec and is effectively sampled every 1 nsec, then the duration of the corresponding waveform R(Y) will be (T$pr$/T$si$)(200 nsec) or 2 msec. If the sampler responds every T$pr$ seconds (that is, to every transmitter trigger pulse as opposed to every other or every $n$th pulse), then the 1 nsec effective intersample time T$si$ corresponds in R(Y) to the transmitter pulse repetition period T$pr$ (to which is assigned the value 10 $\mu$sec in the numerical examples).

Finally, a 5 $\times$ 10$^8$ Hz bandwidth in $r(t)$ is transformed to a bandwidth of 5 $\times$ 10$^4$ Hz in R(Y).

To construct the waveform R(Y), the sampler will have required N independent and successive waveforms $r(t)$, and will have required a time duration NT$pr$. The value of NT$pr$ is the same as the duration of R(Y). The time to construct R = NT$pr$=(200) (10 $\mu$sec)= 2 msec.

As implied by the discussion of the characteristics of and the relations between the two versions $r(t)$ and $R(t)$ of the return signal waveform, it is the representation $R(t)$ which is displayed in the usual application of a sampling oscilloscope. It is also the representation $R(t)$ which is directly utilized in generic SPGR systems such as that of FIG. 1. In these applications, the waveform $R(t)$ is displayed directly on an oscilloscope in its usual single-line display mode or in a raster display mode or is fed to a recorder, such as a helical/spark paper recorder of the type commonly used in geophysical, radar, and ionospheric research.

If fed to an oscilloscope, the 2 msec duration of $R(t)$ can be accommodated without difficulty. However, if $R(t)$ is fed to a helix recorder, the 2 msec duration used as a numerical example is about fifty times too fast. Since the time for such a recorder to write a single line is about 100 msec, it is necessary to further stretch the return signal waveform.

Thus, for direct application to a helix recorder, the transmitter pulse repetition period T$pr$ of a sampler SPGR system similar to that of FIG. 1 must be increased to a value in the neighborhood of T$pr$=500 $\mu$sec in order to achieve a 100 msec duration in $R(t)$. For this value of T$pr$, a 500 MHz bandwidth in $r(t)$ is transformed to 1 kHz in $R(t)$. Such a time duration and bandwidth are suited not only to helix recorder operation, but also to recording on a conventional audio-frequency magnetic tape recorder for later playback and processing.

The time duration 0.1 sec in the return signal waveform R is acceptable from yet another point-of-view. During the 0.1 sec time-to-construct, a transporting surface vehicle travelling at 5 mph would move 0.7 ft, a distance which is small compared to the expected lateral rate of change of subsurface geological features.

However, such relatively slow repetition rates do not allow the system to operate with as high as information flow rate as is possible, and the generic system is still subject to the limitations discussed earlier. The systems of FIGS. 3 and 4, by virtue of incorporation of analog and/or digital signal processing, do overcome these limitations.

The SPGR system of FIG. 3 is an indirect or sampler SPGR system into which has been incorporated digital and/or analog signal processing. Discussion of the analog signal processing and its possible functions is deferred at this point and the discussion here concentrates upon the operation of the digital portion.

There are notable similarities of this system with the generic system of FIG. 1. An alternative connection indicated by a dotted line signal path 24 in FIG. 3 is a bypass connection from the sampler output to the recorder which can be used to bypass the inventively improved portion of the system and to make the system of FIG. 3 functionally identical to that of FIG. 1.

Differences should be noted which are significant. Instead of feeding the sampler analog signal $R(t)$ directly to the record/display section, in the inventively improved system the return signal waveform is fed to the digital signal processor (DSP) 26. The DSP will contain, as a minimum, an analog-to-digital converter (ADC) 28 which effects the transformation of the analog input voltage $R(t)$ into its digital equivalent $R(k)$, one or more digital storage elements for storing $R(k)$ and its composite or processed versions, an accumulator or arithmetic unit for performing mathematical operations upon $R(k)$ and its composite versions, and a digital-to-analog converter (DAC) 30 for transforming digital representations $R(k)$ or $\overline{R}(k)$ into their analog representations for use by the record/display sections. There is also a clock (a generator of repetitive pulses used for timing and control) which times and coordinates the operation of these digital elements. The clock may be contained in the DSP 28 or in a separate controller 16. The process controller itself may utilize digital circuits to control and synchronize the flow of information and pulses among the various system elements.

As was the case with the generic SPGR system of FIG. 1, the operation of the sampler/signal processing SPGR system of FIG. 3 is intimately connected with, and may be understood in terms of, its timing. There are six time scales of interest:

1. sampler strobe duration $\Delta t$ strobe
2. equivalent intersample time $Tsi$
3. pulse repetition time $Tpr$
4. time to construct the stretched-in-time return signal waveform verions $R(t)$ and $R(k)$
5. time to construct a processed version $\overline{R}(k)$
6. time to output $R(k)$ or $\overline{R}(k)$ to a helix recorder Some of these times have already been discussed above. The following discussion continues to use the illustrative numerical values introduced there.

In the case of the generic SPGR system of FIG. 1, the critical question was the time to construct the stretched-in-time return signal waveform $R(t)$. For the signal processing SPGR system of FIG. 3, the critical questions are the time to construct $R(k)$, which is the digital equivalent of $R(t)$, and the time to construct a processed version $\overline{R}(k)$. The time to construct $R(k)$ is the same as that required to construct $R(t)$. They are in fact constructed synchronously. Thus the more significant question becomes the time to construct $\overline{R}(k)$, which depends upon how the successive members $R(j,k)$ of the sequence $[R(j,k); j=1,2,\ldots,L]$ are combined to form $\overline{R}(k)$. That is, this time depends upon the signal processing procedures and algorithms which are implemented. The times required are indicated by a calculation of the time required to construct $\overline{R}(k)$ resulting from a simple averaging of a large number (L) of successive waveforms $R(k)$. The improvement in the signal-to-noise ratio of $\overline{R}$ as compared to R, and the lateral distance moved by a transporting vehicle during the time-to-construct are also examined.

The sampler of the preferred embodiment is of the type used in commercially-available sampling oscilloscopes. The operation and principal elements of these instruments are described in the publications of Tektronix and Hewlett-Packard, two major manufacturers of such equipment. Of primary interest are the sampling gate, the sample strobe generator and how fast it can be driven, the analog memory element (capacitor) and its time constant, and the horizontal sweep (staircase ramp) generator.

Some circuit modifications are desirable. The principal modifications include a means for externally ending and resetting the sweep after the desired number of samples (N) and access to the sample strobe pulses for possible use as trigger or sample command pulses to the ADC in the digital signal processor. Alternatively, the ADC sample compound pulses can be derived from pulses synchronous with the transmitter antenna input pulses. The latter is easier to implement, and is functionally equivalent to the former because of the analog memory element.

As a consequence of these modifications, a sequence of N trigger pulses, which are synchronous with the transmitter antenna input pulses, will generate one return signal waveform $R(t)$ during a single sweep. We have seen that if these pulses are periodic with repetition period $Tpr$, then the time required to construct $R(t)$ is $NTpr$ seconds. The waveform $R(t)$ is constructed, one sample per trigger pulse (i.e., one sample every $Tpr$ seconds), at an equivalent intersample time $Tsi$. The actual intersample time is $Tpr + Tsi$, which is approximately equal to the pulse repetition period $Tpr$ for the numerical values, $Tpr=10$ μsec and $Tsi=1$ nsec, which have been used above.

For the discussion of this SPGR system, it is assumed that a sample is taken for every applied trigger pulse (no trigger countdown), that a sweep consists of N samples (N trigger pulses), and that the time constant of the sampler analog memory element is greater than or at least about equal to the pulse repetition period, i.e. that the time constant of the sampler analog memory $\geq Tpr$. An acceptable and less-restrictive statement of the third assumption would result if "pulse repetition period" were replaced by "pulse separation time," or if the symbol $Tpr$ were interpreted to mean "pulse separation time." This substitution would encompass both periodic and random repetitive transmitter pulse sequences.

When external trigger pulses are applied to a sampler every T$pr$ seconds, a corresponding sequence of sample strobe pulses are generated on a 1:1 basis. That is, a sample strobe pulse occurs shortly after each trigger pulse.

The function of each sample strobe pulse is to cause the sampling gate (typically a four-diode bridge) to admit charge from the signal input line to an analog memory section containing one or more storage capacitors. The charge is admitted during the time $\Delta t_{strobe}$ (the sample strobe pulse duration) and is stored until the next strobe pulse, or for several or tens of microseconds. The amount of charge admitted is proportional to the input signal amplitude during the time of the sample strobe.

If the external trigger pulse is applied every T$pr$ seconds, a sample strobe pulse will be generated every T$pr$ + T$si$ seconds. Thus, there is one sample strobe pulse for each valid trigger pulse, but delayed by T$si$ with respect to the preceding pulse until the entire extent of $r(t)$ has been sampled.

The sample strobe pulse duration is small. Typical values range from 20 psec to 350 psec. For the SPGR application, the sample strobe duration value which is assumed to be $t_{strobe} = 100$ psec will be more than adequate. The strobe duration should be small enough that the voltage $r(t)$ does not change appreciably during the interval $\Delta t_{strobe}$.

Since each sample is present within the analog memory of the sampler for several or tens of microseconds, the waveform $R(t)$ may be fed to the analog-to-digital converter (ADC) in the digital signal processor of FIG. 3. The sampler, in constructing the analog waveform $R(t)$, has sufficiently slowed the time scale of the signal $r(t)$ so that fairly conventional ADC's now have sufficient time to meaningfully digitize the representation $R(t)$.

Two choices of pulses are available to utilize as ADC sample command pulses. First are the sample strobe pulses which occur every T$pr$ + T$si$ seconds, and second are the system trigger pulses occurring every T$pr$ seconds. Strictly speaking, the system should employ the sample strobe pulses so that the ADC sample commands having a fixed delay with respect to the strobe sample pulses. Thus each of the N ADC samples will occur at the same relative time in the analog memory cycle. This is the situation as indicated in FIG. 3.

However, use of the system trigger pulses is much easier to implement and eliminates the need to interface and buffer the sample strobe pulse. Use of the system trigger pulses as ADC sample command pulses introduces a negligible timing difference, compared to use of the sample strobe pulses. For a given sweep, that is, a given construction of an N-sample waveform $R(t)$ or $R(k)$, the time difference between the sample strobe pulses and the system trigger pulses increases linearly with the sample strobe number. This difference is always small. For sample strobe pulse $k=1$, the difference is T$si=1$ nsec. For the final sample strobe pulse $k=N$, the difference is NT$si=200$ nsec. Thus, the use of the system trigger pulses as ADC sample command pulses should be acceptable if the maximum time difference NT$si$ (equivalent to the duration of the basic return signal return waveform $r$) is small compared to the sampler analog memory time constant, and if each ADC sample command pulse is delayed with respect to the corresponding system trigger pulse until the analog memory has settled, which delay should thus be the sum of NT$si$ plus the intrinsic analog memory settling time after a sample strobe pulse. Although a condition similar to the second must be satisfied even if the sample strobe pulses are used as ADC sample commands, the first condition could then be relaxed because of the fixed delay between the strobe sample pulses and the ADC sample command pulses.

From the foregoing discussion, it is evident that during the construction of $R(t)$ by the sampler, a given system trigger pulse or the corresponding strobe sample plus performs two functions. First, it samples a segment $\Delta t_{strobe}$ of the waveform $r(t)$, and second, it instructs the ADC to produce a digital representation of the corresponding voltage level of $R(t)$. This voltage level is approximately constant and is available within the sampler for a time interval comparable to T$pr$ following the sample strobe pulse. The level represents the value of the return signal waveform $r$ during the interval $\Delta t_{strobe}$ at the time $t=k$T$si$, where $k=1,2,\ldots,N$ is the sample number in a given $r(t)$ waveform or the corresponding $R(t)$ waveform.

The digital signal processor, after finding the digital representation of $r(k$T$si)$, stores it in register $k$ of a file of length N, and awaits the next system trigger or sample strobe command to begin a similar digitization and storage process for the value $r[(k+1)$T$si]$. This process continues until the index $k$ has run from 1 to N, a process which uses N distinct waveforms $r(i,t)$ and requires NT$pr$ seconds. Thus after NT$pr$ seconds, a digital representation of $r(t)$ is in the $R(k)$ file of the processor. It is, of course, assumed that the individual members of the N-member set $[r(i,t); i=1,N]$ used in this construction represent reflections from the same target. That is, the system is required to remain stationary (or quasi-stationary) over the target area for NT$pr$ seconds in order to build up the single digital representation of $r(t)$. Operationally speaking, this is not a stringent requirement since NT$pr$ is small compared to the time taken for most surface means of conveyance to move a significant distance. Recall from the earlier discussion that for N=200 and T$pr=10$ $\mu$sec, the value of NT$pr$ is 2 msec.

Denote this slowed-down digital representation of $r(t)$ by R$(j,k)$ where $k=1,$N is the sample number or time index and $j=1,$L is an index used to label a particular $R(k)$, whereby this representation is the $j$-th digital representation of $r(t)$. th The time-to-construct a single waveform R$(j,k)$ has been found to be NT$pr$, which has a typical value of 2 msec. This sequence of N digital words could now be fed to a DAC and applied to a helix recorder to produce one line of an output record, and this would require about 100 msec. Used in this manner, the system of FIG. 3 would be equivalent to the generic SPGR system of FIG. 1.

However, the extreme attenuation by the earth of both the down-propagating and the returning signal makes the return signal likely to possess sufficient noise content to make the signal unusable or ambiguous when displayed in this direct and immediate manner. To overcome this problem, R$(j,k)$ is moved from the single signal file in the digital signal processor into a similar file which can be called the processing file. Then a second representation R$(j+1,k)$ is constructed in the single signal file at the same or an equivalent location. When the construction of R$(j+1,k)$ is complete, it is transferred to the processing file and combined with R$(j,k)$ in such a way and by use of suitable signal averaging or other correlation algorithms that the noise components tend to cancel, whereas the true signal return information tends to add. This process is continued for a suitably appropriate time until L such representations R have been processed. Only at this time is the processed representation of the return signal waveform $r(t)$ delivered to the DAC and then to the record/display output devices. In this way, one obtains significant improvements in signal-to-noise ratio and thus in output record quality. Further, the availability of digital representations of $r(t)$ opens the way to other forms of processing which further reduce record ambiguities and enhance their interpretability.

The time necessary to perform a simple arithmetic average upon L consecutive return waveforms $R(j,t)$ or $R(j,k)$ where $k=1,N$ and $j=1,L$, to derive the final, processed version of the return signal waveform by $\overline{R}(k)$ or $\overline{R}(L;k)$ can be calculated. The time taken to construct $\overline{R}(L;k)$ is LNTpr seconds. To evaluate this expression, the numerical values introduced previously are employed, i.e., $N=200$, and $Tpr=10$ μsec. Thus, the time to average $L=10^4$ waveforms $R(j,k)$ is $LNTpr=20$ sec. Compared to a single $R(j,k)$ waveform, the signal/noise ratio improvement in the averaged waveform $\overline{R}(L;k)$ will be approximately $\sqrt{L} = 100$. This assumes that all of the required arithmetic operations can be performed in real time, essentially in parallel with the construction of $R(j,k)$. For Tpr=10 μsec or thereabouts, this is possible with existing, off-the-shelf analog and digital hardware.

During this time, a transporting surface vehicle having a velocity $v = 5$ mph will have moved about 150 feet. Depending upon the lateral rate of change of the subsurface structure, this lateral spatial average may be unacceptably large. If this is the case, several remedies exist. The depth resolution may be decreased while keeping the maximum depth fixed (i.e., the sample number N may be reduced while increasing the intersample time Tsi and while keeping their product NRsi constant) or, the number of waveforms R used in producing $\overline{R}$ may be reduced (i.e., the value of L may be reduced), or the vehicle velocity may be reduced. The effect of these three remedies upon the time to construct $\overline{R}(L;k)$ and the lateral distance travelled is shown in Table 2. Among other things, the entries of this table indicate that if it is desired to operate such that the helix recorder is driven continuously, or almost so, then sufficient time will be available to average on the order of $L=100$ return signal waveforms R and thus to achieve a signal-to-noise ratio improvement factor of 10. The corresponding lateral spatial averaging distance is less than 2 feet. These values can be adjusted in either direction, depending upon the physical parameters of the target and the required improvement in the displayed return signal waveform.

There is yet another significant way in which the time-to-construct the processed waveform $\overline{R}(L;k)$ may be reduced. This approach is based upon the observation that the signal-to-noise ratio of the return signal waveform $r(t)$ is not the same throughout its duration. The signal-to-noise ratio $(s/n)$ becomes progressively poorer as one proceeds from the beginning of $r(t)$ to the end. This is because the later portions of this signal have suffered greater attenuation and dispersion than the earlier portions, due to the necessarily greater travel distance through the earth of the later portions. Thus, in constructing $\overline{R}(L;k)$ from the L-member sequence $[R(j,k); j=1,L]$, it is not necessary to average or treat the low-index $R(k)$ values in the same way as the high-index $R(k)$ values are averaged or treated. For example, whereas all of the L values of $R(j,N)$ may be used in constructing $\overline{R}(N)$ in the sequence $R(k)$, it may be necessary to use only L/10 values of $R(1)$ to achieve a comparable improvement in $s/n$. That is, in order to achieve a uniform improvement in $s/n$ of $\overline{R}(L;k)$ as compared to $R(j,k)$, it is not necessary to utilize all LN values of the matrix $R(j,k)$. If it is not necessary to utilize them, there is no need to spend time collecting them. Only what is needed should be collected.

Essentially, a greater number of samples are collected to represent those portions of the signal return from the greater depths than is collected to represent the signals from the lesser depths, whereby, through signal averaging techniques, the inherently poorer signal-to-noise ratios at the greater depths can be improved to match or approximate the better $s/n$ ratios from the lesser depths without a waste of time to collect redundant samples of the relatively noise-free signal return from the lesser depths.

To accomplish this, it is necessary to reverse the order in which the values $R(j,k)$ are collected and assembled to form a processed return signal waveform. To construct the return signal waveform $\overline{\overline{R}}(L,k)$, the following general steps are followed:

Step 1 Fix the initial value of $j$ and then step through the time or sample number indices $k=1,N$ to assemble the values $[R(j,k); k=1,N]$ Step 2 Transfer this string of N values to a process or other storage file Step 3 Replace $j$ by $j+1$ and repeat until $j=L$, at which time the result would be (for simple averaging):

$$\overline{R}(L;k) = \frac{1}{L} \sum_{j=1}^{L} R(j,k)$$

To distinguish the return signal waveform resulting from collection and assembly of the values $R(j,k)$ in reverse order, the notation $\overline{\overline{R}}(k)$ is introduced. In somewhat more detail, the steps for construction of the (reverse order) return signal waveform $R(k)$ are as follows:

Step 1 Set $k=1$ (the first time or depth increment) and step through $j=1,J(1)$ to form $$\overline{\overline{R}}(1) = \frac{1}{J(1)} \sum_{j=1}^{J(1)} R(j,1)$$

Note that the index $j$ now serves as the sample number index. The index $j$ takes on the integer values $1, 2, 3, \ldots J(1)$ where the upper limit $J(1)$ is the number of samples taken at $k=1$. The time taken to form $\overline{\overline{R}}(1)$ is $Tpr \cdot J(l)$ + time for one division Step 2 Set $k=2$ (the second time/depth increment) and step through $j=1,J(2)$ to form $$\overline{\overline{R}}(2) = \frac{1}{J(2)} \sum_{j=1}^{J(2)} R(j,2)$$

Here the sample number index $j$ takes on the integer values $1, 2, 3, \ldots J(2)$ where the upper limit $J(2)$ is the number of samples taken at $k=2$. The value of $J(2)$ will probably be larger than the value of $J(1)$. The time to form $\overline{\overline{R}}(2)$ is $Tpr \cdot J(2)$ + time for one division.

Repeat until Step N Set $k=N$ (the final time/depth increment) and step through $j=1, J(N)$ to form $$\bar{\bar{R}}(N) = \frac{1}{J(N)} \sum_{j=1}^{J(N)} R(j,N)$$

The sample number index $j$ takes on the integer values $1, J(N)$ where $J(N)$ may be set equal to L in order to provide a comparison with $\bar{R}(L;k)$. The time to construct $\bar{\bar{R}}(N)$ is $Tpr \cdot J(N)$ + time for one division.

This set of steps will construct the N components (in time or depth as represented by the index $k=1,N$) of the processed return signal waveform $\bar{\bar{R}}(k)$, $k=1,N$. The definition of $\bar{\bar{R}}$ and this set of steps are used in order to construct a processed return signal waveform in a time shorter than $LNTpr$, the time necessary to construct the previously-considered return signal waveform $\bar{R}(L;k)$, $k=1,N$ and in order to capitalize on the observation that the signal-to-noise ratio of an individual return signal waveform $r(t)$ or $R(t)$ needs least improvement for small $t$ and most improvement for large $t$. Thus, the time-to-construct a processed return signal waveform and achieve also a relatively uniform $s/n$ throughout the processed (and finally displayed) return signal waveform can be reduced. Further, by suitable choice of the function $J(k)$, one can concentrate upon a desired depth range, say 20 feet to 30 feet instead of the full range 0 to 30 feet.

The time-to-construct and the nature of the enhancement in $\bar{\bar{R}}$ obviously depend upon the choice of the function $J(k)$. In general, J will increase monotonically with $k$, so as to counter the effects of increasing attenuation and dispersion as a function of the depth sampled by the return signal waveform. For example, three specific $J(k)$ distributions are presented below, including examination of one in detail.

Since it is desired to compare the times-to-construct of $\bar{R}$ and $\bar{\bar{R}}$, these distributions are cast in terms of L, which, in the case of $\bar{R}$, represented the number of waveforms $\bar{R}(j,k)$, $k=1,N$ averaged to form $\bar{R}$. Thus, each value $R(k)$ represents an average of L values $R(j,k)$, $j=1,L$. In each distribution J, the coefficients should be arranged such that the following boundary and functional conditions are met:
1. $J(1) = 1$ (a single-sample average at $k=1$)
2. $J(N) = L$ (an L-sample average at $k=N$)
3. $J(1) < J(k) < J(k+1) < J(N)$ (monotonically increasing)

The first distribution $J(k)$ is the exponential distribution, where $$J = \text{integer nearest to} \left[ L \left[ 1 - \exp - \frac{(L-1)}{(N-1)}(k-1) \right] \right] \text{ for } k=1,N.$$

This distribution is one which counteracts the exponentially-increasing attenuation with depth of the return signal waveform. It is, however, not the only exponential distribution and may not be the most suitable. The restriction "integer nearest to" may result in an occasional violation of the functional condition 3 above (i.e., there may occur a $k$ for which $J(k) = J(k+1)$). The boundary condition 1 is satisfied, while 2 is satisfied for $L >> 1$. Although it is not calculated, the time-to-construct $\bar{\bar{R}}$ using this convex-downward $J(k)$ distribution is certainly less than $LNTpr$ (the time to construct $\bar{R}$) and is greater than $LNTpr/2$. This will become evident after examination of the third distribution.

A distribution $J(k)$ which is perhaps more physically appropriate is the convex-upward exponential distribution where $$J = \text{integer nearest to} \left[ \exp \left[ \frac{(k-1)}{(N-1)} \log_n L \right] \right] \text{ for } k=1,N.$$

Use of this distribution to construct the return signal waveform $R(k)$, $k=1,N$ would require less than $LNTpr/2$ seconds.

The third distribution, which is considered here in more detail, is given by the expression $$J = \text{integer nearest to } [1 + (k-1)(L-1)/(N-1)] \quad \text{for } k=1,N.$$

This is a distribution in which J increases linearly (in a stepwise fashion) with the depth/time index $k$. It might be speculated that the time to construct the return signal waveform R using this $J(k)$ distribution would be about one-half the time to construct R, since only one-half of the values $R(j,k)$ is required or used.

Generally, for a distribution $J(k)$ used to construct $\bar{\bar{R}}$, the time-to-construct, using the sampler system of FIG. 3, is the sum of the terms set forth in the algorithm for total time to construct $$\bar{\bar{R}} = Tpr \cdot \sum_{k=1}^{N} J(k) + N \cdot (\text{time for one division}) = Tpr \cdot \sum_{k=1}^{N} J(k)$$

The term describing the time for division is ignored since, first, it is intrinsically small (for N=200, the total time to divide is about 2 msec to 3 msec depending upon the computer), second, it can be made small enough by reduction to a binary-shift-register operation that each divide can be accomodated within the basic time $Tpr$ (requires that $J(k)$ always equal some power of 2), and third, if a relatively slow device (such as a helix recorder with a writing speed of 0.1 sec per line or per return waveform $\bar{\bar{R}}$) is used to record and display $\bar{\bar{R}}$, then the divide can be performed at the end of the construction of the sums in $\bar{\bar{R}}$ as each word $\bar{\bar{R}}(k)$ is presented to the DAC and sent to the recorder. The third alternative will, in effect, take no time since each word $R(k)$ can be divided while its predecessor $\bar{\bar{R}}(k-1)$ is being written by the recorder.

In the $\bar{\bar{R}}$ mode of constructing a return signal waveform, each value or word $\bar{\bar{R}}(k)$ could be fed immediately to the helix recorder or other record/display device as soon as its value is available. It is not necessary to wait until the entire N-member sequence of values $[R(k), k=1,N]$ is constructed. Such an output procedure (value-by-value or word-by-word as each is constructed as opposed to a completed sequence) may not be desirable, however, for two reasons. First, unless the record/display device is specifically designed for or is compatible with this mode of operation, the image quality may be degraded in a discontinuous mode of line writing. Such is the case with most helix recorders designed for geophysical applications. On the other hand, an oscilloscope would be amenable to this mode of operation, and there are xerographic facsimile image recorders specifically designed to write in a word-by-word fashion. The second reason is that the word-by-word output procedure may preclude further signal processing operations, either analog or digital, which should be performed upon an entire sequence of words or values. Alternatively, a buffered operation or other techniques can be used to circumvent this possible disadvantage.

Thus for the distribution $$J = 1 + (k-1)(L-1)(N-1) \quad \text{for } k=1,N$$

the time to construct the entire return signal waveform $\bar{\bar{R}}(k)$, $k=1,N$ is given by the expression for the to construct $$\bar{\bar{R}} \equiv Tpr \cdot \sum_{k=1}^{N} J(k)$$

$$= Tpr \cdot \sum_{k=1}^{N} \left[1 + (k-1)\left(\frac{L-1}{N-1}\right)\right]$$

$$= NTpr(L-1)/2$$

$$\simeq LNTpr/2$$

the result $$\sum_{k=1}^{N} k = N(N+1)/2$$

has been used. The time to construct the return signal waveform $\bar{R}$ is about half that needed to construct $\bar{\bar{R}}$.

Thus, it is seen that, for the processes of digitizing and obtaining a noise-free (or at least noise-suppressed) version of the short duration, large bandwidth, basic return signal waveform $r(t)$, it is required that the return signal waveforms $r(t)$ be repetitive, but not necessarily periodic. A second system approach, the direct SPGR system with digital signal processing, as typified by FIG. 4 is possibe. Certain further processing techniques become practical (for both systems) when one has available a return signal waveform in digital form.

The system of FIG. 4 can be termed a direct digital SPGR system since it digitizes and utilizes completely the information content of each basic return signal waveform $r(t)$. This direct and complete use of each waveform $r(t)$ within the system pulse repetition time is in contrast to the single sample use of each waveform $r(t)$ in the indirect or sampling systems of FIGS. 1 and 3. Because such sampling techniques are unnecessary, neither the stretched-in-time return signal waveform R nor any of its variants will be needed or dealt with. Instead the system is described in terms of the return signal waveform r and its variants.

Since the direct digital system utilizes essentially all of the information in each waveform $r(t)$, it is much faster than the indirect systems. At present, it is also more difficult and costly to implement.

Earlier, the notation $r(k)$ or $r(i,k)$ for $k=1,N$ and $i=1$ was introduced for the direct digital representation, using N words or samples, of the analog return signal waveform $r(t)$, where k serves as the sample number, time, or depth index, and i serves as the transmitter pulse index. Now the techniques for and the time necessary to construct a single version of $r(k)$, $k=1,N$ will be considered. This digitized return signal waveform is then available for immediate display or for use in signal processing with other versions.

If it is assumed that the time duration of $r(t)$ is 200 nsec and a sampling interval $Tsi = 1$ nsec is chosen (as before), then there are 200 samples in each digital representation of $r(t)$. If each of the 200 words in a representation $r(k)$, $k=1,N$ were 7 bits in length, then the ADC in the system of FIG. 3 would have to operate at an equivalent burst mode rate of 7 gigabits/sec, which is very fast.

One presently-available realization of the direct digital system of FIG. 4 utilizes multi-channel, parallel operation to obtain the 200 samples. As indicated in FIG. 4, parallel, sample-and-hold/multiplex techniques in unit 22 can be used to utilize the full time available between transmitter pulses. For example, where 10 $\mu$sec (the transmitter pulse repetition period) are available to obtain the desired 1400 bits, then the single-channel, average conversion rate is 140 Megabits/sec. This conversion rate is achieved by some of the fastest ADC systems now commercially available. But where the digitizing task is shared among 20 ADCs (each processing 10 channels in 10 $\mu$sec), then the conversion rate for each ADC would be a more conservative 7 Megabits/sec.

Though they are relatively costly at present compared to the indirect or sampling SPGR systems, the direct digital SPGR systems are considerably faster. Using the value $Tpr = 10$ $\mu$sec, the time to provide L $=10^4$ digital copies of $r(t)$ for use in signal processing (LTpr) is $10^4 \cdot 10$ $\mu$sec or about 0.1 sec. This 0.1 sec is about the line-writing time of a helix recorder. If the $10^4$ copies of $r(t)$ are used to construct the simple average $r(L;k)$, $k=1,N$ $$r(L;k) = \frac{1}{L} \sum_{i=1}^{L} r(i,k) \qquad k=1,N$$

and if the noise in $r(t)$ is random, then the signal-to-noise ratio in the averaged return signal waveform $r(k)$, $k=1,N$ will be improved by the ratio $\sqrt{L} = 100$ compared to that of an individual return signal waveform $r(k)$, $k=1,N$.

Thus, for $L = 10^4$, a signal-to-noise ratio improvement of 100 can be realized in 0.1 sec and can be output to the record/display device. During this time interval of 0.1 sec, a transporting vehicle having a speed of 5 mph will have moved 0.7 feet. This lateral distance is small compared to the lateral rate of change of most subsurface geological formations, and hence should represent an acceptable lateral spatial average.

The foregoing discussion of the indirect and the direct digital SPGR systems which incorporate digital signal processing has concentrated upon procedures for obtaining a digital representation of the return signal waveforms, and upon the use of many individual return signal waveforms in linear combinations so as to provide an averaged or otherwise processed version in which the signal-to-noise ratio is improved. The primary interest was in securing a faithful, digitized version of the voltage appearing at the output terminals of the receiving antenna.

The obtaining of such a noise-suppressed version of the return signal waveform $r(t)$ is significant but may be viewed as only an important first step. In terms of its interpretability to a human observer, the basic return signal waveform r(t) may not be the most desirable waveform to display or write. Given the capability, one may wish to perform further mathematical operations upon the averaged return signal waveform r(t) prior to display. The target return information present in r(t) would be preserved but would be transformed into a less ambiguous and more meaningful form. Such a transformation could be implemented digitally, or through the use of analog circuits, or by both, depending upon the operations to be carried out. In the notational language used above, these operations and transformations would be effected upon the processed or averaged waveforms r, $\overline{R}$ or $\overline{\overline{R}}$, in digital or analog form as appropriate. If the signal-to-noise ratio is satisfactory, the operations and transformations would of course be carried out using the waveforms r or $\overline{R}$.

Figure 5:
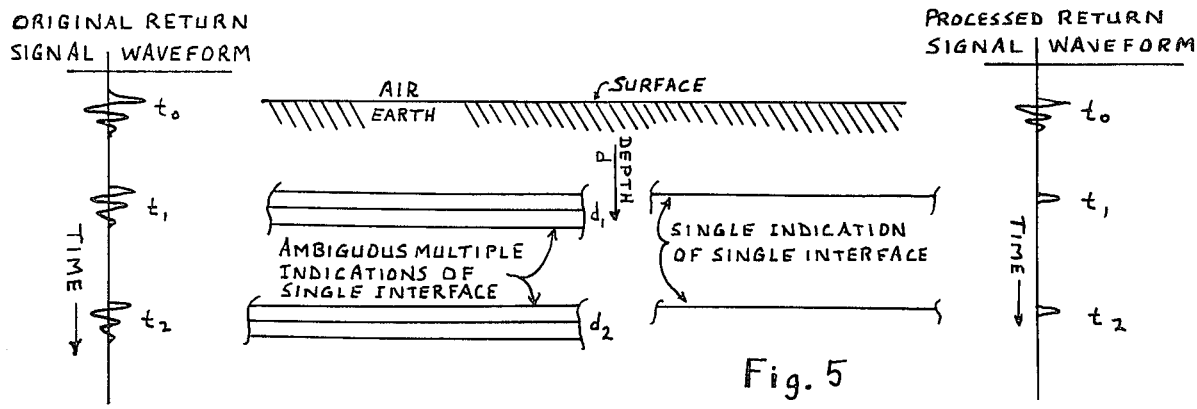
FIG. 5 is an illustrative diagram showing the effect of removal of multiple interface ambiguities from the return signal waveform in the above diagrams.

There are at least three reasons why one might wish to perform still further operations upon the return signal waveform. The first is the possibility of transforming the idealized wavelet reflection return into a unipolar pulse prior to writing or displaying the return signal waveform. The effect of such a transformation upon the image formed by the displayed return signal waveform is illustrated in FIG. 5. In this illustration, two simple, planar subsurface interfaces are assumed. These interfaces lie at depths $d_1$ and $d_2$. The reflected wavelets appear at the corresponding times $t_1$ and $t_2$, where $$t_i = \sum_{j=1}^{i} 2 n_j d_j / c,$$

n denoting the index of refraction and c the velocity of light in vacuum. In the left portion of FIG. 5 is depicted the original return signal waveform and the resultant image. The two bipolar wavelets correspond to reflections, from the two interfaces, of the radiated waveform $E_q(t)$. If only the positive excursions of the bipolar wavelet are written, then the reflection from each interface will appear to have originated in reflections from closely-spaced multiple interfaces instead of from a single interface. In the right portion of FIG. 5 is shown the image resulting from writing the return signal waveform after each reflection wavelet has been transformed into a unipolar pulse similar to g(t), the transmitter antenna input pulse.

The transformation of each bipolar reflection wavelet to simple unipolar pulse can be effected through algorithms based upon a theoretical understanding of the relation between the voltage waveform applied to the transmitting antenna, the radiated waveform, the propagation and reflection processes, and the voltage waveform induced in the receiving antenna. The algorithm could involve auto-correlation, cross-correlation with an ideal waveform, digital or analog filtering, multiple integration, or a non-linear process such as rectification. The important point is that a theoretically- or empirically-based algorithm can be found which will effect the transformation and remote this display ambiguity. The availability of a noise-suppressed digital return signal waveform and a digital signal processor can be quite powerful in carrying out the transformation.

A second reason for further processing of the return signal waveform is implementation of algorithms for removal of the hyperbolic displayed image resulting from traverse over a subsurface point object or target. This requires storage of sufficient adjacent lines (waveforms) to provide a basis for distinguishing the hyperbolic response of a point target.

A third reason is the application of synthetic aperture radar or optical techniques to stored return signal waveforms so as to increase the spatial (lateral and depth) resolution. This requires not only relatively noise-free versions of the return signal waveforms, but also mass storage capability. Such capability can be provided very conveniently at present by magnetic disc or drum storage systems. Acoustic holography is a related processing application which requires digital techniques applied to a large data base (many successive return signal waveforms).

The significant point is that these sophisticated and powerful signal processing operations and their benefits and advantages become accessible when one has available within a SPGR system the capability for providing a digitized return signal waveform, storage, and a digital processor.

The fifth limitation of prior SPGR systems has to do with operation of a SPGR system for sub-bottom profiling over salt water. If the entire system is carried by a surface craft, the system is rendered useless by the extreme attenuation of the transmitted pulse waveforms. The frequency spectrum of the radiated waveforms $E_q(t)$ resulting from the application of the pulses g(t) to the transmitting antenna may have a bandwidth on the order of 500 MHz. The conductivity of salt water is such that exponential attenuation occurs over distances on the order of the skin depth $\delta$, which is a function of the conductivity $\sigma$, the magnetic permeability $\mu$, and the frequency f:

$$\delta = \sqrt{\frac{1}{\pi \mu \sigma f}}$$

Setting $\mu = \mu_0 = 4\pi \, 10^{-7}$ henry/m, the permeability of free space, the values of the skin depth $\delta$ at several frequencies over the bandwidth of interest are given below:

| frequency f (MHz) | skin depth $\delta$ (cm) |
|---|---|
| 5 | 10 |
| 10 | 7.1 |
| 20 | 5.0 |
| 50 | 3.2 |
| 100 | 2.2 |
| 200 | 1.6 |
| 500 | 1.0 |

From the values tabulated above, it can be seen that the skin depths in sea water for various frequencies over the bandwidth of interest are in the range 1 cm to 10 cm. This implies that all of the high frequency, wide-bandwidth components of the SPGR system must be placed in close proximity to the bottom to minimize the attenuation due to the highly conductive water. The same may be true to a lesser degree for fresh water or brackish water operation. In this regard, sea water represents a worst case.

Thus a way of enabling operation of a SPGR system for salt (or conductive) water sub-bottom profiling is to place the high-frequency, wide bandwidth components in a towed or remotely-guided conveyance or enclosure placed upon the bottom or in close proximity (on the order of a skin depth) to it. Depending upon the nature of the bottom, the enclosure or conveyance can be towed or self-propelled. Depending upon the distance above the bottom and upon the degree of salt water diffusion into the layers below the surface, longer signal averaging or processing times are likely to be necessary.

Included in the sea bottom enclosure are the transmitting antenna, its pulser, the receiving antenna, the analog gate and wideband amplifier, and the sampler (the SPGR systems of FIGS. 1 and 3) or the fast ADC (FIG. 4). Reduced-bandwidth sampler output signals or ADC output data are transmitted to the surface over a suitable cable or by means of an acoustic (or other) telemetry link. Further processing and display take place within the surface portion of the system.

Figure 6:
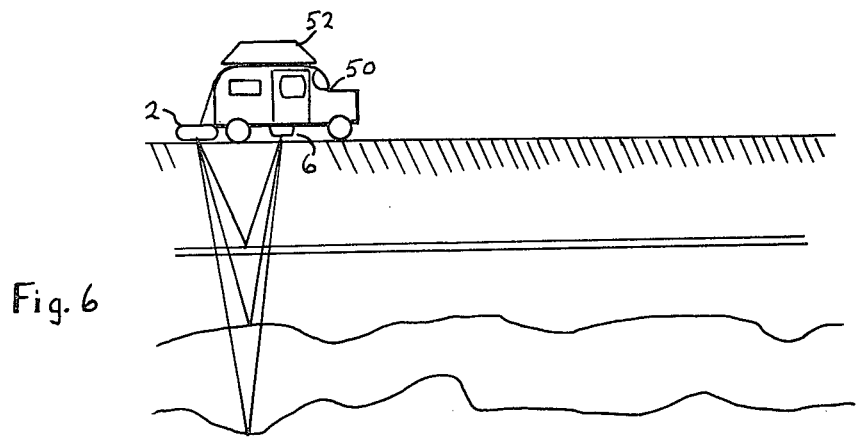
FIG. 6 is a diagram showing that both prior art systems and systems according to the present invention are used in transport vehicles to move them across the surface of the earth.

In FIG. 6 a vehicle 50 is shown carrying a SPGR system 52, including a transmitting antenna 2 and a receiving antenna 6. The vehicle 50 moves over the surface 54 of the ground, causing the SPGR system to be scanned over the subsurface regions.

Figure 7:
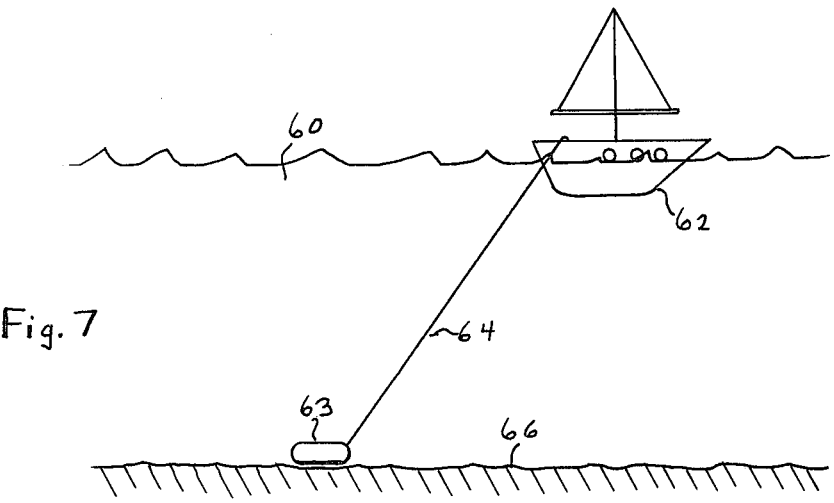
FIG. 7 is a diagram showing how the present invention can be used to perform geophysical surveys under salt water.

In FIG. 7 a system for use with salt water 60 is illustrated. A boat 62 carries the transducting elements of an SPGR system at the end 63 of a cable 64, thereby eleminating most of the salt water intervening between the transducer and the underwater surface 66.

FIGS. 8 through 20 disclose in more detail a specific embodiment of the system of FIG. 3.

Figure 8:
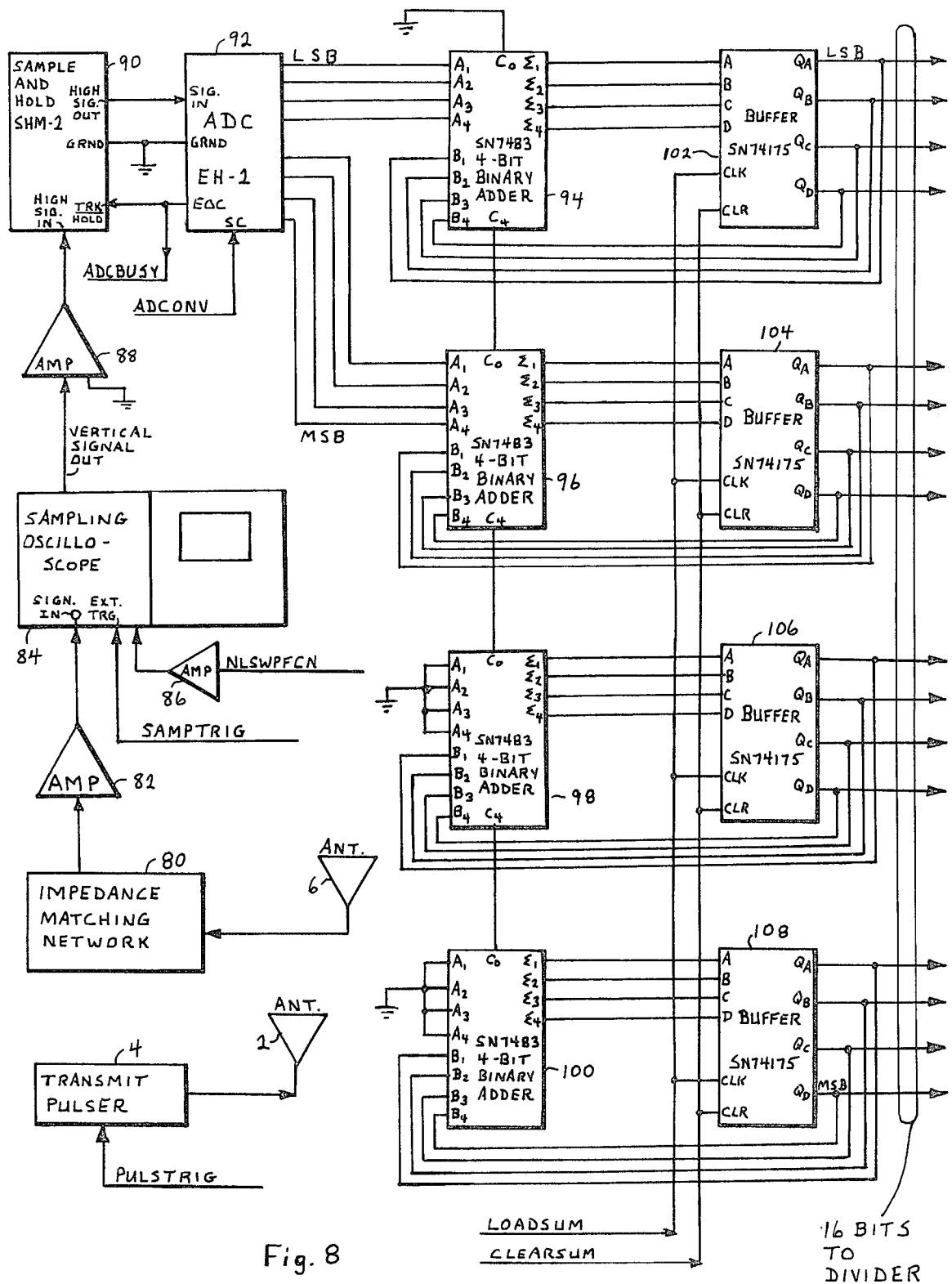
FIG. 8 is a more detailed diagram of that portion of an indirect SPGR system corresponding to the transmission section, the receiving section, the sampler and display, the analog-to-digital converter and parts of the necessary signal processing.

Referring to FIG. 8, after the transmitting antenna 2 is triggered by the transmit pulser under control of a signal PULSTRIG, the signal as reflected by subsurface anomalies is returned to the receiving antenna 6 to provide a return signal through an impedance matching network 80 and then through an amplifier 82 to the SIGNAL IN terminal of a sampling oscilloscope 84. A signal SAMPTRIG is applied to the EXTERNAL TRIGGER terminal, and a signal NLSWPFCN (non-linear sweep function) is amplified in an amplifier 86 and applied, as shown in FIG. 18, to control the sweep of the oscilloscope. With the minor modification illustrated in FIG. 18, the sampling oscilloscope 84 is preferably the Hewlett-Packard Model 180D oscilloscope mainframe with a model 1810A sampling plug-in unit. The sampled output signal VERTICAL SIGNAL OUT from oscilloscope 84 is applied through an amplifier 88 to the HIGH SIGNAL IN terminal of a sample-and-hold circuit 90. The sample-and-hold circuit may be integrated circuit type SHM-2, manufactured and sold by Datel Systems, Inc. The track mode and hold mode are alternatively controlled by a signal ADCBUSY (ADC busy) applied to the TRACK/HOLD terminal of circuit 90. The signal held in circuit 90 is applied from the HIGH SIGNAL OUT terminal to the SIGNAL IN terminal of an analog-to-digital converter (ADC) 92. The ADC may be integrated circuit type EH-1, manufactured and sold by Datel Systems, Inc. The signal ADCBUSY is derived from the end-of-conversion (EOC) terminal of ADC 92, while a signal ADCONV is applied to the start conversion (SC) terminal of the ADC.

The ADC 92 provides an eight-bit binary output ranging from least significant bit (LSB) to most significant bit (MSB) and applied respectively to terminals A1, A2, A3, and A4 of a first 4-bit binary counter 94 and to terminals A1, A2, A3 and A4 of a second 4-bit binary counter 96. The 4-bit binary counters may be integrated circuit type SN 7483 manufactured and sold by Texas Instrument (TI). There is no carry bit into adder 94, and the carry output from adder 94 is provided as a carry input to adder 96. Two additional 4-bit adders 98 and 100 are provided and have their A1, A2, A3 and A4 inputs grounded. The carry output from adder 96 is provided as a carry input to adder 98, and the carry output from adder 98 is provided as a carry input to adder 100. The sum outputs Σ1, Σ2, Σ3 and Σ4 from adders 94, 96, 98 and 100 are provided respectively to inputs A, B, C and D of respective buffers 102, 104, 106 and 108. The buffers may be of integrated circuit type SN 74175, manufactured and sold by TI. The outputs QA, QB, QC and QD of buffers 102, 104, 106 and 108 provide sixteen bits of binary information to a divider (see FIG. 13), and provide binary feedback respectively to inputs B1, B2, B3 and B4 of respective adders 94, 96, 98 and 100.

Together the four adders and four buffers act as an accumulator to sum and store the digital values of a set of sampled return signals taken from a particular depth, so that, when the sum value is divided by the total number of samples from that depth, an average value (with good signal-to-noise ratio) will be derived as the quotient. At the start of a sampling cycle at a particular depth, the signal CLEARSUM is applied to the clear terminals of each of the buffers, thereby dropping the sixteen buffer outputs to zero. An initial set of input values for the first sample from ADC 92 is provided to the A inputs of adders 94 and 96. The sum outputs become available from the adders, and when signal LOADSUM becomes available at the clock inputs of the buffers, the sum values from adders 94 and 96 are stored in buffers 102 and 104 and become available at the outputs of the buffers. The buffer outputs are fed back to the B inputs of the adders, where they are eventually summed with a new set of A inputs from the next sample. While adders 98 and 100 and buffers 106 and 108 are connected with similar feedback, the grounding of the A inputs of the adders and initial clearing of the buffers causes the outputs to be initially zero. Only when carry signals begin to arrive from adder 96 do adders 98 and 100 begin causing buffers 106 nd 108 to store the most significant values of the 16 bits to be sent to the divider.

FIG. 9 illustrates the derivation of some of the timing and control signals used in the preferred embodiment. A 20-MHz clock 110 which may be a crystal clock of type K 1091A as manufactured and sold by Motorola, provides signal SYSCLK as the basic system clock signal. As can be seen from the signal charts in FIG. 19, the signals SAMPTRIG AND PULSTRIG (in this embodiment, the same signal, although embodiments are possible in which timing differs slightly) are timed to occur at every eighth SYSCLK pulse. The clock signal SYSCLK is used to clock a stored pulse through two sequentially connected four-bit shift registers 112 and 114, which may be integrated circuit type N 74S195, manufactured and sold by Signetics. A parity checker 116 is provided to reinsert a pulse at the beginning of shift register 112 when the previous pulse has been clocked out. The parity checker may be integrated circuit type 82S62, manufactured and sold by Signetics. By taking the output from the first output position of shift register 112 on line 118, the PULSTRIG and SAMPTRIG signals are provided at every eighth clock pulse of SYSCLK.

The SYSCLK signal is also applied to clock a flip-flop 120, which may be half of an integrated circuit type SN 7474, manufactured and sold by TI. A signal LASTSMPL (last sample) is applied to the data input D, a signal LOADCTR is applied to the preset input PR, and a high (ONE) input is applied to the clear terminal CLR to prevent clearance. The NOT Q output is a signal DIVCYCLE to the A input of a monostable multivibrator (MS/MV) 122, which may be half of an integrated circuit type SN 74123, manufactured and sold by TI. The B input of MS/MV 122 is the PULSTRIG signal from line 118. The clear terminal is provided with a NOT RESET signal. Thus the Q output of MS/MV 122 provides a signal which is connected to the A input of a similar MS/MV 124. The B input terminal is connected to a high (ONE) input, and clear is provided by NOT RESET. Thus the Q output of MS/MV 124 is the signal ADCONV (ADC on voltage), and is provided to start conversion in ADC 92. As seen in FIG. 19, the two MS/MV's generate the ADCONV signal as slightly delayed from the PULSTRIG signals to MS/MV 122, until stopped by the LASTSMPL signal to flip-flop 120, indicating that the last sample in a word has been taken. Then, during the period for normalization by division, the ADC is not required to operate and the ADCONV signal stops.

The ADCBUSY signal from ADC 92 is applied to the A input terminal of a similar MS/MV 126. A high (ONE) signal is applied t the B input and the NOT RESET signal is applied to the clear input CLR. The NOT Q terminal provides a signal LOADSUM as a short pulse at the termination of each ADCBUSY pulse. An additional MS/MV 128 is provided with a signal INCRWORD at its A input and the NOT RESET signal at its B and clear (CLR) inputs. The output from the NOT Q output terminal is supplied as the signal LOADCTR to flip-flop 120 and to two four-bit counters to be discussed later. A NAND gate 130 is provided at its inputs with signal NOT RESET and CLRSUM, and provides an output through an inverter 132 as a signal CLEARSUM.

Referring now to FIG. 12, a bistable element composed of two NAND gates 136 and 138 is set by a manually operated switch 140 to provide a NOT RESET signal when the switch is manually put in an OPERATE position and to provide a RESET signal to reset the system when the switch is manually put in a RESET position. The NOT RESET SIGNAL is the inverted value of the RESET signal.

Referring to FIG. 10, a MS/MV 142, similar in construction to those of FIG. 9, is provided with the LASTSMPL signal at its A input and the LOADSUM signal from MS/MV 126 at its B input. The NOT RESET signal is provided to the clear terminal CLR of MS/MV 142. The output Q provides the signal DIVIDE to the divider of FIG. 13.

FIG. 11 illustrates part of the system which allows the system to be more easily tested. As discussed elsewhere, this embodiment assumes that a record is made of anomalies of various depths consisting of 256 words of 8 bits per word. Furthermore, each word is constructed by averaging up to 256 samples per word, with small numbers of samples per word being used at slight depths and larger numbers of samples per word being used at greater depths, to thereby increase the effective signal-to-noise ratio at greater depths. However, in testing or setting up equipment, it may be desired to process only the first word (called word 0) or the 256th word (called word 255). Thus, when switch 146 makes contact 148, only word 0 will be processed, while contact 150 causes only word 255 to be processed. When contact 152 is made, the system operates in a normal sequence from word 0 through word 255. In the preferred embodiment, in this figure $V_{cc}$ is +5 v.d.c., the illustrated resistors are 1 kohm and the illustrated capacitors are 0.1 microfarads. Two flip-flops 154 and 156, each of which may be half of an integrated circuit type SN 7474, manufactured and sold by TI, are provided with various signals from switch 146. When the switch is made to contact 152, a low input signal (ZERO) is applied to the present input PR of each flip-flop to preset the Q outputs to ONE, initially making the output of NAND gate 158 ZERO and the output of inverter 160 ONE. The output of inverter 160 is the SAW X (stop after word X) signal. A high (ONE) signal is maintained on the clear terminals of the flip-flops to prevent clearance of the stored values. When switch contact is not made to contacts 148 or 150, both D inputs are high (ONE) and a clocking input CLK serves to drive the corresponding Q output to ONE and signal SAW X from inverter 160 to ONE. Thus the signal FRSTWORD to clock flip-flop 156 to its Q output, providing switch 146 makes contact 152. But if switch 146 makes contact 148 or 150, then respectively signal FRSTWORD or LASTWORD will cause one of the inputs of NAND gate 158 to go to ZERO, making the SAW X signal ZERO.

A MS/MV 162 of the type discussed above receives the SAW X signal at its B input terminal and maintains its Q output (INCRWORD — increment word) at ZERO and its NOT Q output (CLRSUM — clear sum) at ONE so long as the B input (SAW X) is ONE, a change of the A input (that is signal DIVBUSY) of MS/MV 162 from ONE to ZERO cause a momentary ONE pulse on the Q output and a corresponding momentary ZERO pulse on the NOT Q output. This is seen by comparing the INCRWORD, CLRSUM, and DIVBUSY signals in FIG. 19. The NOT RESET signal is applied to the clear input of MS/MV 162. The DIVBUSY signal is inverted in an inverter 164 to form the LOADDAC (load digital-to-analog converter) signal.

Figure 14:
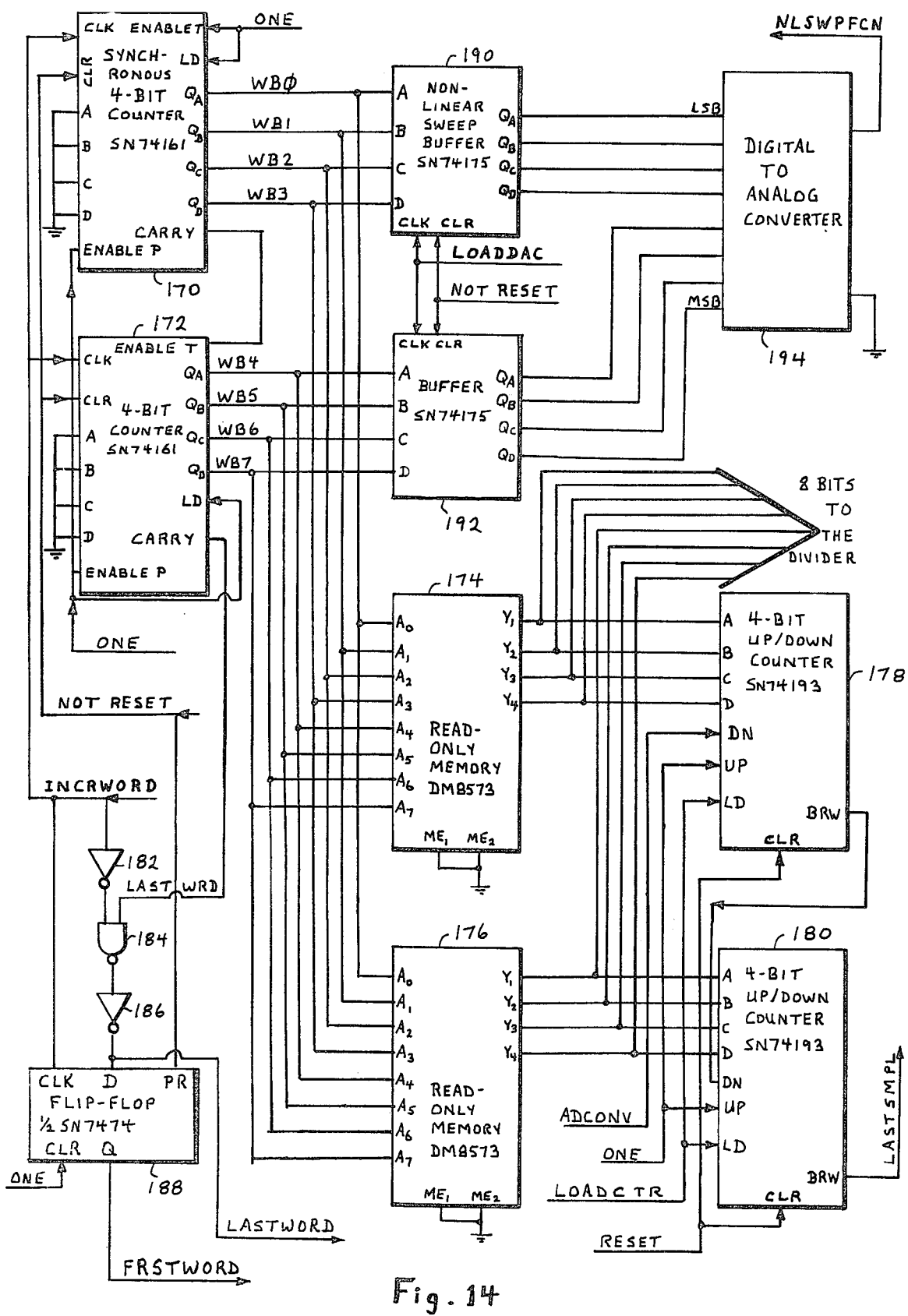

Referring now to FIG. 14, two synchronous 4-bit counters 170 and 172, which may be integrated circuits type SN 74161, manufactured and sold by TI, are used as word counters and address generators to determine what word number is being operated upon. The four data inputs A, B, C and D of each counter are grounded. The ENABLE T input of counter 170 is provided with a fixed ONE input, so that the count is incremented by one for each clock pulse until the counter is cleared or generates a carry. The carry from counter 170 is provided to the ENABLE T input of counter 172, so that the two counters together generate eight word bits WB$\phi$ through WB7. The clock pulses to increment the word counters are provided by signal INCRWORD and the clear by signal NOT RESET. The word bits WB$\phi$ through WB7 are applied in parallel to the inputs of two read-only memories (ROM's) 174 and 176, which may be circuit type DM 8573, manufactured and sold by National Semiconductor Corp. These ROM's serve as decoders to determine the required number of samples to be taken for any given word. For each word, from 0 to 255, the corresponding number of samples is stored in the ROM and appears in parallel at the output terminals Y1, Y2, Y3 and Y4 of the two ROM's. This number of samples is provided as eight bits to the divider for use in normalizing the accumulated sample values. It is also applied as initial data to the A, B, C and D inputs of two 4-bit up/down counters 178 and 180, which may be integrated circuit type SN 74193, manufactured and sold by TI. Because the UP inputs are held at a high (ONE) value while the DOWN inputs are pulsed, these counters only count down. After signal LOADCTR is applied to cause loading of the counter, the pulse signal ADCONV, which occurs once for each sample, is applied to cause the two counters to count down. When counter 180 generates a borrow pulse, indicating that it has completely counted down, the borrow pulse is taken as a signal LASTSMPL to indicate the last sample in a word.

The signal INCREWORD is inverted in an inverter 182, and the inverter output is combined in a NAND gate 184 with the signal LASTWRD from counter 172, and the NAND gate output is inverted again by inverter 186 to derive a signal LASTWORD. The signal LASTWORD is applied to the D input of a flip-flop 188, of the type used in FIG. 11. The signal INCRWORD is used at each word increment to clock flip-flop 188, and a high (ONE) input to the clear terminal prevents clearance. The flip-flop is preset by the NOT RESET signal. Thus, the Q output of flip-flop 188 is high from the occurrence of the INCRWORD signal which ends the last word in a series until the INCRWORD signal which ends the first word in a new series, thereby providing a signal FRSTWORD.

Non-linear sweep buffers 190 and 192, which may be integrated flip-flop circuits type SN 74175, manufactured and sold by Signetics, receive the present word count from counters 170 and 172 at input terminals A, B, C and D and stores the count. The buffers provide the stored count to a digital-to-analog converter (DAC) 194, for conversion into a signal NLSWPFCN (non-linear sweep function), representing the present analog value of the word count, for application to oscilloscope 84 through inverter 86. This NLSWPFCN signal will be explained more fully in connection with FIG. 20.

Referring now to FIG. 13, a divider 198 is provided with a 16-bit numerator from the buffers of FIG. 8 and an 8-bit denominator from the read-only memories of FIG. 14. When triggered by a DIVIDE signal, the divider divides the 16-bit accumulated sample value for a given word by the number of samples taken for that word, thereby generating an 8-bit normalized sample value for that word. The divider also provides a signal DIVBUSY (divider busy) for use in control and timing, as an input to elements 162 and 164. The 8-bit normalized value is stored in two 4-bit flip-flop buffers 200 and 202, then provided to a DAC 204 to provide a corresponding analog value. This analog value is amplified by amplifier 206 to provide a signal SIGFCN for recording and display as an indication of anomalies as a function of depth.

Figure 15:
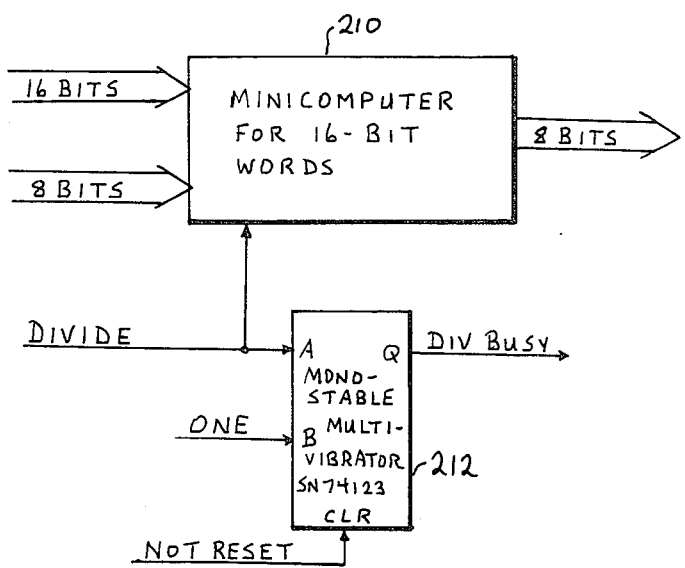
FIGS. 15 and 16 represent dividers usable in the system of FIG. 13.
Figure 16:
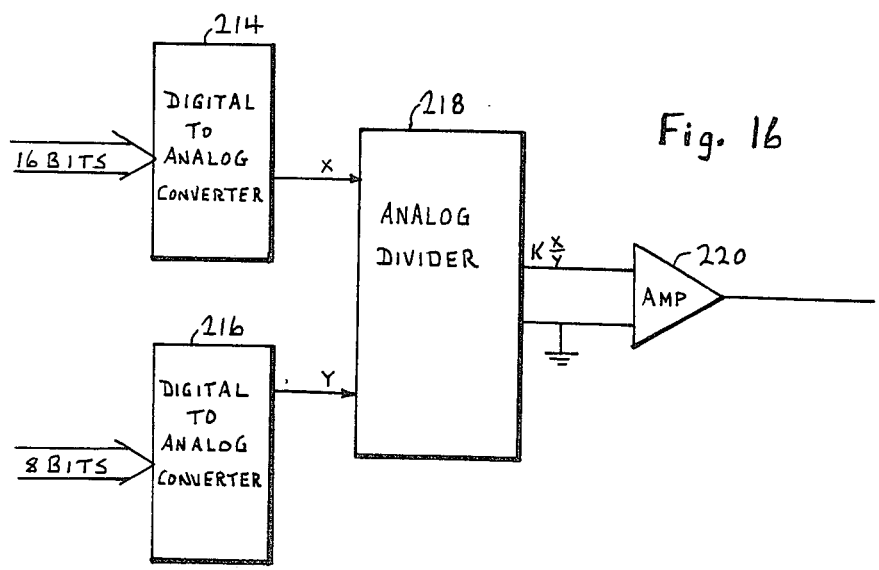

FIGS. 15 and 16 illustrate two possible embodiments of divider 198. In FIG. 15, a programmed mini-computer 210 is used for the actual division and a MS/MV 212 is used for generating a control signal. In FIG. 16, DAC's 214 and 216 respectively convert the 16-bit and 8-bit signals to analog values for division in an analog divider 218. In this embodiment, a holding amplifier 220 can be used, and elements 200, 202, 204 and 206 of FIG. 13 omitted. Or, an 8-bit divider can be modified to form a 16-bit divider as suggested on pages 5–38 and 5–39 of the TTL Applications Handbook, edited by Peter Alfke and Ib Larsen and prepared and published by Fairchild Semiconductor. Or, if the number of samples per word, as held in ROM's 174 and 176 is always power n of two, then the division can be performed by shifting the binary point of the accumulated value by n places. Or in some embodiments, preservation of the absolute amplitude of the return signal may not be necessary if the preservation of timing information can be arranged, whereby the depths of various anomalies can be known without knowing the severity of the various anomalies. In this instance, the number of samples per word can be adjusted to approximately compensate for return signal attenuation at the depth represented by the word, thereby obtaining a uniform signal amplitude versus depth characteristic.

FIGS. 17 and 18 respectively show an unmodified version of the 1810A sampling plug-in ordinarily used with a Hewlett-Packard 180D mainframe and a very slightly modified version used with the present invention. Those interested should refer to a Hewlett-Packard publication 01810–90901 entitled Operating and Service Manual — 1 GHz Plug-In (Sampling) 1810A (August 1971), and specifically to page 8–19, FIG. 8–22, entitled "Marker, Blanking and Scan Generator A10 Schematic", where that portion of the prior art device which must be modified is fully described. The modification consists of disconnecting the wiper terminal of potentiometer R6B from front panel switch A1556, labelled MANUAL-SWEEP, and connecting signal NLSWPFCN to the just-disconnected switch terminal. Then the front panel label reading "MANUAL" should be replaced with a label reading "EXTERNAL SWEEP" (which is NLSWPFCN) and the label reading "SWEEP" should be changed to read "INTERNAL SWEEP" (a linear sweep).

Figure 20:
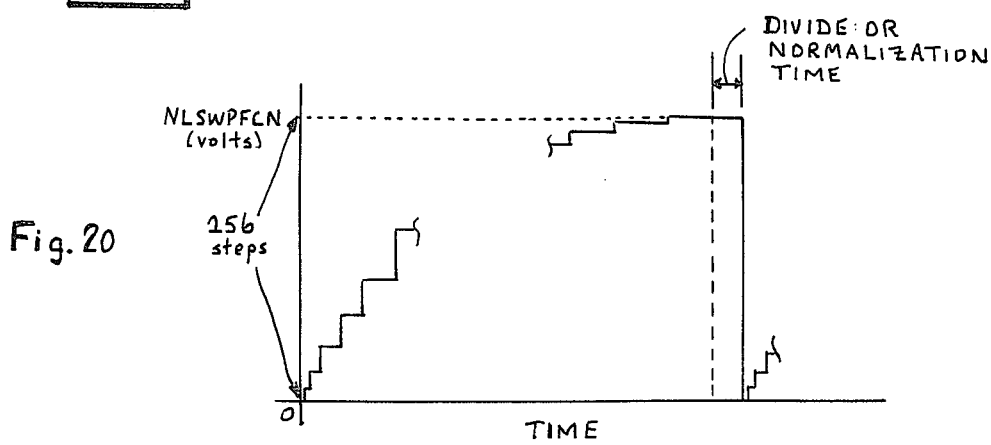
FIG. 20 is a voltage-time chart of a typical non-linear sweep function (NLSWPFCN) for use with the modified sampling oscilloscope.

FIG. 20 illustrates the signal NLSWPFCN as a function of time. The signal voltage rises in 256 steps. The greater voltages represent longer return times for the transmitted signal. Generally, the longer the return time, the greater the noise introduced into the returned signal and the more samples needed to overcome this noise. Thus the lower values of NLSWPFCN last only long enough for perhaps one sample, while the higher-voltage values of NLSWPFCN may last up to 256 samples to allow for noise elimination by averaging. One rise and fall cycle of NLSWPFCN lasts long enough to produce one complete record at one position of the earth's surface. At the end of the cycle, an indeterminate amount of time is allowed for normalization and further processing.

Thus, in operation, a pulse is transmitted into the earth and its reflection is received at different times from different depths. The sampling oscilloscope 84, under control of the non-linear sweep function signal NLSWPFCN, takes a sample from each return signal at a chosen depth. Values stored in ROM's 174 and 176 determine how many samples are to be taken from any given depth. The sample is held in circuit 90 for conversion to a digital value in ADC 92. Adders 94, 96, 98 and 100 and buffers 102, 104, 106 and 108 accumulate (successively total) all of the samples taken at a given depth to generate a 16-bit cumulative total for later normalization to reduce noise. Meanwhile, counters 170 and 172 keep track of which depth and thus which word of data is currently being worked on. Buffers 190 and 912 and DAC 194 are controlled by counters 170 and 172 to cause the DAC to generate a non-linear sweep function analog signal NLSWPFCN to cause scope 84 to sample parts of the return signal corresponding to the word being worked on. Counters 170 and 172 also read out information from ROM's 174 and 176 to determine how many samples will be taken from each depth (i.e., for each word) and to provide 8 bits to the divider for normalization. Counters 178 and 180 count down from the desired number of samples per word with each successive sample to thereby determine when all desired samples have been taken at a given depth. Divider 198 divides the 16-bit cumulated total of samples at a given depth by the 8-bit number of samples per word (or per depth to derive a normalized value which is converted in DAC 204 to an analog value for display. The digital output of divider 198 could be used directly in digital applications.

Although the invention has been described in considerable detail with reference to certain preferred embodiments thereof, it will be understood that variations and modifications can be effected within the spirit and scope of the invention as described above and as defined in the appended claims.

I claim:
1. In a geophysical radar system comprising:
   A. transmitting means for transmitting repetitive short radar pulses into the earth,
   B. receiving means for detecting reflected radar energy returned as the repetitive pulses are reflected from various discontinuities at various depths within the earth, and
   C. output means for providing an indication of the reflected radar energy in a form which is intelligible to a human observer,
   the improvement comprising:
   D. deriving means responsive to the detected radar energy for deriving a sequence of digital representations of the amplitude of the reflected energy as said reflected energy is detected by the receiving means at another corresponding sequence of instants in time, each of said instants occurring at individually selected amounts of time after each corresponding transmitted pulse is transmitted into substantially the same part of the earth, whereby the digital representations represent whatever discontinuities are present at corresponding depths into the earth,
   E. selecting means for selecting said individually selected amounts of time according to the attenuation suffered by reflected radar energy as received at the receiving means from said selected depths such that a greater plurality of said digital representations are derived for selected depths suffering greater attenuation than are derived for selected depths suffering lesser attenuation, and
   F. combining means for combining all of the sequence of digital representations formed at one depth at substantially one part of the earth to form a combined representation with improved signal-to-noise ratio.

2. A system according to claim 1 wherein the combining means is a normalizing means for normalizing all of the sequence of digital representations.

3. A system according to claim 2 wherein the selecting means further comprises:
   A. generating means for generating a non-linear sweep-function signal for causing the deriving means to derive said sequence of digital representations at a sequence of instants in time representing a plurality of depths which are determined by the non-linear sweep-function signal,
   B. memory means responsive to the particular depth at which representations are presently to be derived for providing a read-out value of the number of digital representations which are required at the particular depth to compensate for the attenuation of reflected pulses returning from said particular depth, and
   C. counter means responsive to said read-out value and to the number of digital representations which have already been made at the particular depth for determining when all of the required digital representations required at the particular depth have been derived for causing the generating means to change the value of the non-linear sweep-function signal.

4. A system according to claim 3 wherein the normalizing means further comprises:
   A. accumulator means for totalling all of the sequence of digital representations formed at one depth at substantially one part of the earth to form a dividend signal, and
   B. divider means for dividing the dividend signal by said read-out value to thereby derive said normalized representation.

5. A system according to claim 4 wherein the deriving means further comprises:
   A. sampling means responsive to the non-linear sweep-function signal and to the reflected radar energy as detected by the receiving means for deriving an analog sample from each pulse of the reflected radar energy at a time which is controlled by the non-linear sweep-function signal, and
   B. conversion means for converting the analog sample to said digital representation.

6. A system according to claim 5, wherein said divider provides said normalized representation as a digital value, and further comprising digital-to-analog conversion means for providing an analog value of the normalized representation.

* * * * *